US011888560B2

(12) United States Patent
Raghavan et al.

(10) Patent No.: US 11,888,560 B2
(45) Date of Patent: Jan. 30, 2024

(54) TRANSMIT GAIN ADJUSTMENTS IN ULTRA-WIDE BANDWIDTH BEAMFORMING WIRELESS COMMUNICATION SYSTEMS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/412,069

(22) Filed: Aug. 25, 2021

(65) Prior Publication Data
US 2022/0069877 A1 Mar. 3, 2022

Related U.S. Application Data

(60) Provisional application No. 63/071,302, filed on Aug. 27, 2020.

(51) Int. Cl.
*H04B 7/06* (2006.01)
*H04W 52/52* (2009.01)
*H04B 1/04* (2006.01)

(52) U.S. Cl.
CPC ............ *H04B 7/0617* (2013.01); *H04B 1/04* (2013.01); *H04W 52/52* (2013.01); *H04B 7/0626* (2013.01); *H04B 2001/0416* (2013.01)

(58) Field of Classification Search
CPC .... H04B 7/0695; H04B 7/088; H04B 7/0617; H04B 7/0408; H04B 7/0626; H04B 7/0417; H04B 7/0413; H04B 7/086; H04B 7/0456; H04B 7/0619; H04B 7/0452; H04B 7/024; H04B 7/06; H04B 7/0639; H04B 7/0628;
(Continued)

(56) References Cited

U.S. PATENT DOCUMENTS

2004/0215435 A1 10/2004 Hunt et al.
2017/0059688 A1* 3/2017 Gan .................. G01S 3/325
(Continued)

*Primary Examiner* — Golam Sorowar
(74) *Attorney, Agent, or Firm* — Loza & Loza, LLP

(57) ABSTRACT

Aspects of the disclosure relate to beam management systems and procedures. In one example, a network node is configured to determine beam-specific gain adjustments for use with a set of wireless communication beams, wherein the wireless communication beams have one or more different beamformed spatial orientation parameters. The network node is also configured to apply the beam-specific gain adjustments to wireless communications with an access terminal. In another example, an access terminal is configured to receive beam-specific gain adjustments from a network node for use with a set of wireless communication beams, wherein the wireless communication beams have one or more different beamformed spatial orientation parameters. The access terminal is also configured to apply the beam-specific gain adjustments to wireless communications with the network node. Hierarchical beam management systems and procedures are also described. Illustrative examples exploit frequencies above 24.25 gigahertz (GHz).

30 Claims, 19 Drawing Sheets

(58) Field of Classification Search
CPC .... H04B 7/063; H04B 7/0645; H04B 7/0848; H04B 7/0404; H04B 17/309; H04L 5/0048; H04L 5/0053; H04L 5/0023; H04L 5/0051; H04L 5/0091; H04L 5/0007; H04L 5/0094; H04L 5/0055; H04L 5/005; H04L 5/0092; H04L 27/2607; H04L 5/001; H04L 5/0057; H04L 25/0224; H04L 27/2613; H04L 5/0028; H04L 5/1469; H04L 65/1023; H04L 25/0204; H04L 41/0813; H04W 72/046; H04W 72/042; H04W 16/28; H04W 74/0833; H04W 24/10; H04W 72/0446; H04W 24/08; H04W 74/0808; H04W 72/1289; H04W 72/0453; H04W 76/27; H04W 80/02; H04W 88/02; H04W 48/12; H04W 48/16; H04W 56/001; H04W 72/048; H04W 72/04; H04W 72/0413; H04W 84/045

See application file for complete search history.

(56) References Cited

U.S. PATENT DOCUMENTS

| | | | |
|---|---|---|---|
| 2018/0199328 A1* | 7/2018 | Sang | H04B 7/0617 |
| 2019/0222279 A1* | 7/2019 | Xi | H04B 7/0408 |
| 2019/0356438 A1 | 11/2019 | Lee et al. | |
| 2020/0059867 A1 | 2/2020 | Haghighat et al. | |
| 2020/0204244 A1* | 6/2020 | Hajimiri | H04B 7/0697 |
| 2020/0382356 A1* | 12/2020 | Costa | H04L 27/2647 |
| 2022/0103213 A1* | 3/2022 | Wigren | H04B 7/0617 |
| 2023/0006713 A1* | 1/2023 | Zirwas | H04B 7/01 |

\* cited by examiner

TRANSMIT GAIN ADJUSTMENTS IN ULTRA-WIDE BANDWIDTH BEAMFORMING WIRELESS COMMUNICATION SYSTEMS

CROSS-REFERENCE TO RELATED APPLICATIONS

The present application for Patent claims priority to Provisional Application Ser. No. 63/071,302, titled "TRANSMIT GAIN ADJUSTMENTS IN ULTRA-WIDE BANDWIDTH BEAMFORMING WIRELESS COMMUNICATION SYSTEMS," filed Aug. 27, 2020, and assigned to the assignee hereof and hereby expressly incorporated by reference herein as if fully set forth below and for all applicable purposes.

FIELD OF THE DISCLOSURE

The technology discussed herein generally relates to wireless communication systems, and more particularly, to beam management within ultra-wide band wireless communication systems.

DESCRIPTION OF RELATED ART

Ultra-wide band wireless communication systems include, for example, wireless networks equipped to operate at 24.25 gigahertz (GHz) or above (often referred to as "FR2 and beyond" within 3GPP). Within such networks, beam squinting errors can affect beam management such as beam selection. There is an on-going need to provide systems and techniques for use in ultra-wide band wireless communication systems that provide for improved beam management.

SUMMARY

The following presents a summary of one or more aspects of the present disclosure, in order to provide a basic understanding of such aspects. This summary is not an extensive overview of all contemplated features of the disclosure, and is not intended to either identify key or critical elements of any or all aspects of the disclosure or delineate the scope of any or all aspects of the disclosure. Its purpose is to present some concepts of one or more aspects of the disclosure in a form as a prelude to the more detailed description that is presented later.

In one aspect of the disclosure, a network node is provided that includes a transceiver; a memory; and a processor communicatively coupled to the transceiver and the memory. The processor of the network node is configured to: determine beam-specific gain adjustments for use with a plurality of wireless communication beams, wherein the wireless communication beams have one or more different beamformed spatial orientation parameters; and apply the beam-specific gain adjustments to wireless communications with an access terminal.

Another aspect of the disclosure provides a method for wireless communication for use by a network node. The method includes: determining beam-specific gain adjustments for use with a plurality of wireless communication beams, wherein the wireless communication beams have one or more different beamformed spatial orientation parameters; and applying the beam-specific gain adjustments to wireless communications with an access terminal.

In yet another aspect of the disclosure, an access terminal is provided that includes a transceiver; a memory; and a processor communicatively coupled to the transceiver and the memory. The processor of the access terminal is configured to: receive beam-specific gain adjustments from a network node for use with a plurality of wireless communication beams, wherein the wireless communication beams have one or more different beamformed spatial orientation parameters; and apply the beam-specific gain adjustments to wireless communications with the network node.

Still another aspect of the disclosure provides a method for wireless communication for use by an access terminal. The method includes: receiving beam-specific gain adjustments from a network node for use with a plurality of wireless communication beams, wherein the wireless communication beams have one or more different beamformed spatial orientation parameters; and applying the beam-specific gain adjustments to wireless communications with the network node.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
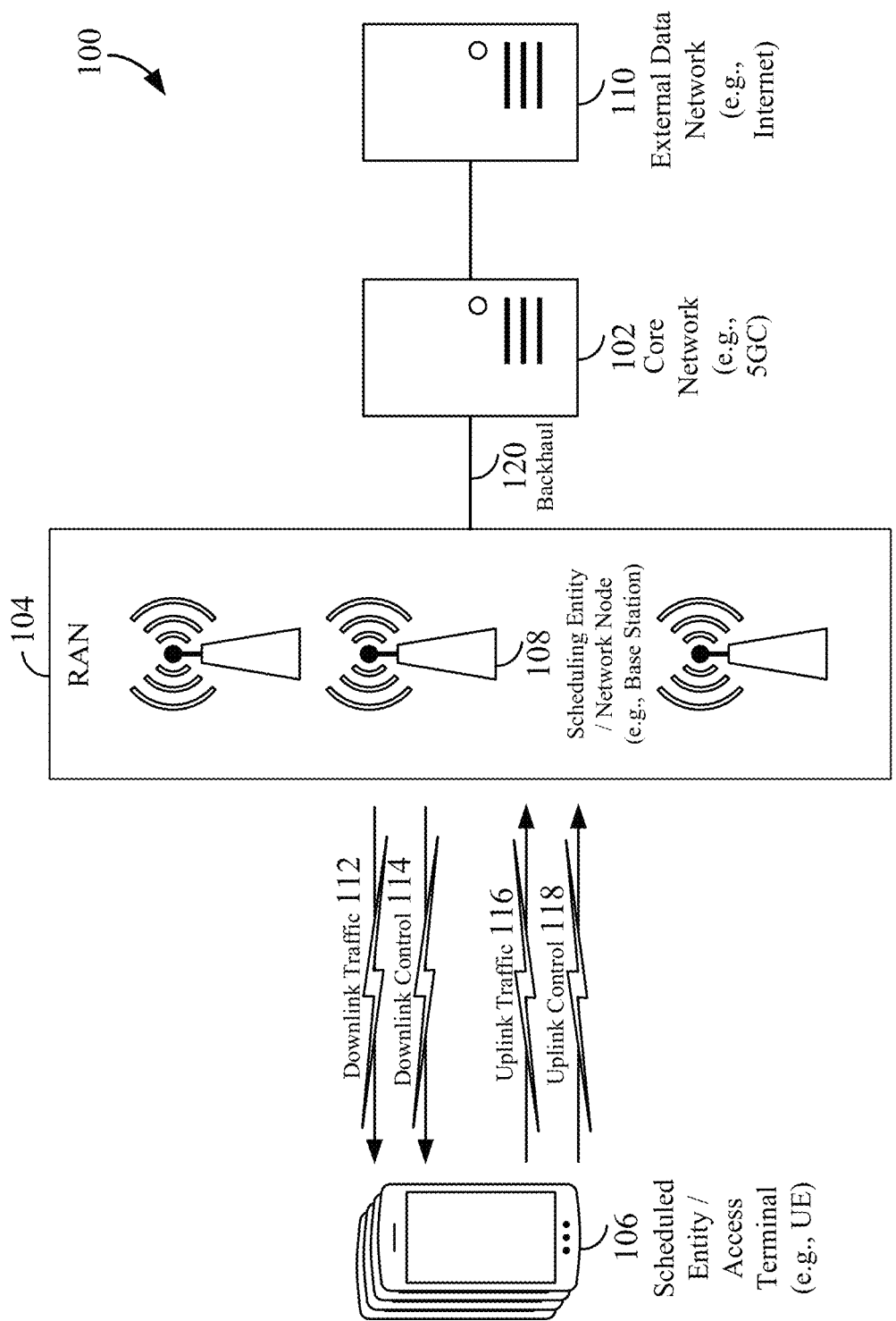
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As noted above, within ultra-wide band wireless communication systems, beam squinting errors can affect beam management such as beam selection. Beam squint refers to the angle that a transmission is offset from the normal of the plane of the antenna. For example, it is the change in the beam direction as a function of operating frequency, polarization, or orientation. Beam squinting issues can arise, for example, due to the provision of a relatively small number of radio-frequency (RF) component chains within a wireless device, such as chains of RF phase shifters and the like, and due to the use of RF chains for ultra-wide band beamforming. For example, analog/RF beamforming with a limited set of phase shifters can result in significant beamforming performance loss from beam squinting due to a constrained way in which beam weights can be used across a large frequency range. Only a limited number of components may be provided within a mobile device due to practical size, power, and operating temperature limitations within the device. Although a base station may have more space to accommodate more RF components, issues can still arise in base stations pertaining to power usage and operating temperature, and so even within base stations a relatively small number of RF component chains may be provided, resulting in beam squinting errors and signal transmission losses or latencies.

To mitigate these and other issues, wireless devices may be configured to perform beam management procedures to select beams and determine beamforming parameters for use in signal transmissions to another wireless device. For example, a base station may perform a beam management procedure in conjunction with a mobile device such as a user equipment (UE). In some examples, a hierarchical or multistage beam management procedure employs broader beams over a set of synchronization signal blocks (SSBs) with narrower beams then refined over channel state information reference signal (CSI-RS)/sounding reference signal (SRS) resource set symbols. Beamforming parameters that may be determined or obtained during beam management may include, e.g., beamformed spatial orientation parameters such as peak gain direction, beam-width, side lobe levels, side lobe directions, beam nulls and null directions, grating lobes and grating lobe directions.

The broad beams are employed in an attempt to provide an approximate flat array gain response over a coverage area of interest. This is so there is substantially no bias over any specific cluster independent of the direction in which the cluster can be pointed towards, which can be identified using the broader beam and then refined over CSI-RS/SRS. However, broad beams can have wide array gain variations over the intended coverage area. The variations arise due to RF chain impairments (such as phase accuracy—precision and calibration issues), limited amplitude control, and the usage of a relatively small number of beams to cover the area of interest.

Note that broad beams over SSBs rely on tight phase and amplitude control (which is typically not available due to cost, complexity and device circuit area considerations) and hence can have performance deterioration as different system factors change. In particular, significant signal-to-noise (SNR)/signal strength variations can arise (e.g., up to 6 dB with N=64, up to 9 dB for a 64×4 array, etc., for six SSB signals in a burst set). The variations generally increase as: the number of antenna elements increases; the number of SSB signals/beams in SSB burst set decreases; the phase shifter and/or amplitude resolution decreases; the coverage area of SSB signals increases; and the wideband coverage increases. The signal strength variations (as a function of a cluster direction angle-of-arrival/angle-of-departure (AoA/AoD)) can be determined for a particular family of devices (such as a particular family of mobile device models of a particular original equipment manufacturer (OEM)), which share fixed or uniform broad beam device designs. The use of a power control loop to adjust for signal strength variations can be problematic as power control loop adjustments can have a significant impact on other system parameters such as on intended modulation and coding scheme (MCS), MCS decoding, rate control, etc. Without compensating for such variations, unpredictable link margins and unpredictable system performance issues can arise. For example, because of signal variations across transmit angles, a sub-dominant cluster in a channel can appear to be dominant leading to beam refinement of the weaker cluster (e.g., can be weaker up to 6 dB for N=64 or 9 dB for a 64×4 array, etc.).

Aspects of the present disclosure provide various apparatus, methods, and systems that provide for beam-specific array gain adjustments to address these or other issues. In some examples, the beam-specific gain adjustments are stored in a lookup table, with different adjustments specified for different SSBs. While generally applicable to SSBs and broad beams, the beam-specific gain adjustments described herein can also be applied to CSI-RS/SRS signals. Such beam-specific adjustments can become particularly important at higher carrier frequencies, such as frequencies above 24.25 GHz and, for example, at frequencies within the 52.6 GHz-114.25 GHz band (which also may be referred to as "upper millimeter wave bands" or "sub-THz regime").

In at least some examples, the various apparatus, methods, and systems disclosed herein may be implemented within a wireless communication network configured in accordance with 3rd Generation Partnership Project (3GPP) New Radio (NR) specifications (often referred to as 5G NR or just 5G).

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

Still further, additional operating bands FR3, FR4 and FR5 have been identified (or are in the processes of being identified and standardized) for 5G NR, such as an FR3 and an FR4 band. In one aspect, FR4 corresponds to frequencies above 52.6 GHz, such as 52.6 GHz to 114.25 GHz and 1-R5 corresponds to a band higher than 114.25 GHz. FR3 is often taken to refer to a band between FR1 and FR2 (7.125 GHz to 24.25 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 and FR3 for 5G NR and/or all or part of a 30 GHz-300 GHz waveband. It should also be understood that the terms "sub-6 GHz" and "millimeter wave," if used herein, are intended to represent modifications to such example frequency bands that may occur do to author/entity decisions regarding wireless communications, e.g., as presented by example herein. In at least some examples, the systems and procedures described herein are implemented within 5G NR systems operating at above 24.25 GHz, regardless of nomenclature. It should be understood that these examples are not intended to limit claimed subject matter. For example, unless specifically recited, claimed subject matter relating to wireless communications is not necessarily intended to be limited to any particular author/entity defined frequency band, or the like.

Before discussing these and other techniques in detail, an overview of a wireless communication system is provided. However, it is noted that the various concepts presented throughout this disclosure may be implemented across a broad variety of telecommunication systems, network architectures, and communication standards.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106, which may be an access terminal. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3GPP NR specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a RAN responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), network node, or some other suitable terminology.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized user access over other types of information, e.g., in terms of prioritized user access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a network node or scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at an access terminal or scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as network nodes or scheduling entities. That is, in some examples, a UE may function as a scheduling entity, scheduling resources for one or more access terminals or scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the access terminal or scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
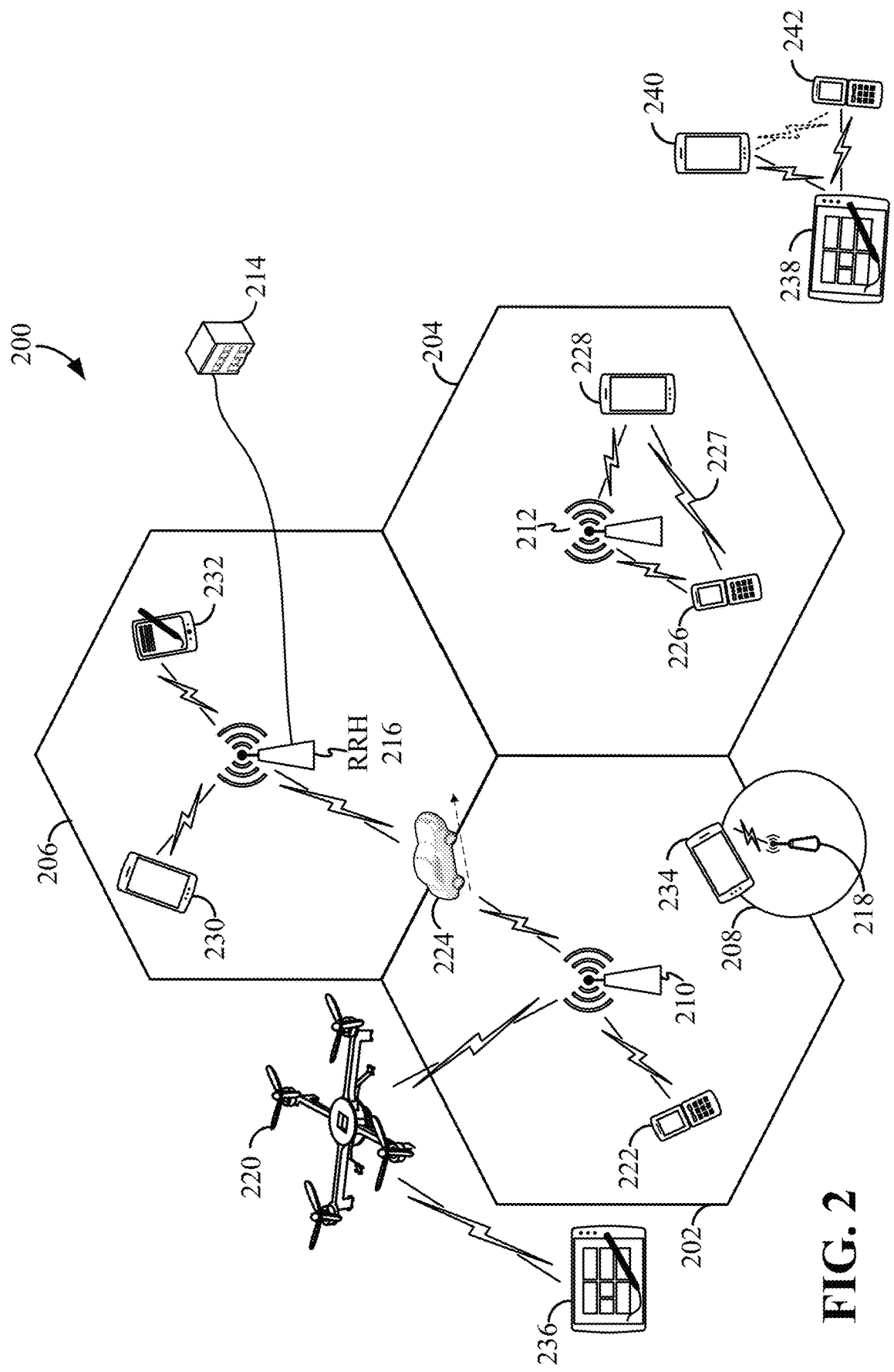
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the network node/base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of the parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In order for transmissions over the RAN 200 to obtain a low block error rate (BLER) while still achieving very high data rates, channel coding may be used. That is, wireless communication may generally utilize a suitable error correcting block code. In a typical block code, an information message or sequence is split up into encoded code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding, based on nested sequences. For these channels, puncturing, shortening, and repetition are used for rate-matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of the channel codes for wireless communication.

However, even with the best error correcting codes, if the communication channel experiences a very large amount of noise, or experiences a deep fade or other issue, the bit error rate may exceed what can be compensated. Accordingly, many wireless communication networks utilize a hybrid automatic repeat request (HARQ) scheme to further improve data reliability. In a HARQ algorithm, the transmitting device (e.g., a base station or UE) may retransmit code blocks (e.g., encoded using convolutional or block codes) if the first transmission is not decoded correctly at the receiving device. To facilitate this process, a transmitted encoded code block may include a cyclic redundancy check (CRC) portion, a checksum, or any other suitable mechanism known to those of ordinary skill in the art to determine whether the encoded code block is decoded properly at the receiving device. If the received encoded code block is properly decoded, then the receiving device may transmit an acknowledged (ACK), informing the transmitting device that a retransmission is not needed. However, if the received encoded code block is not properly decoded, then the receiving device may transmit a not acknowledged (NACK) requesting a retransmission. In general, a limited number of retransmissions will be made before the transmission attempt is terminated. Many existing networks limit their HARQ algorithms to four retransmissions. However, any suitable retransmission limit may be utilized in a network within the scope of the present disclosure.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
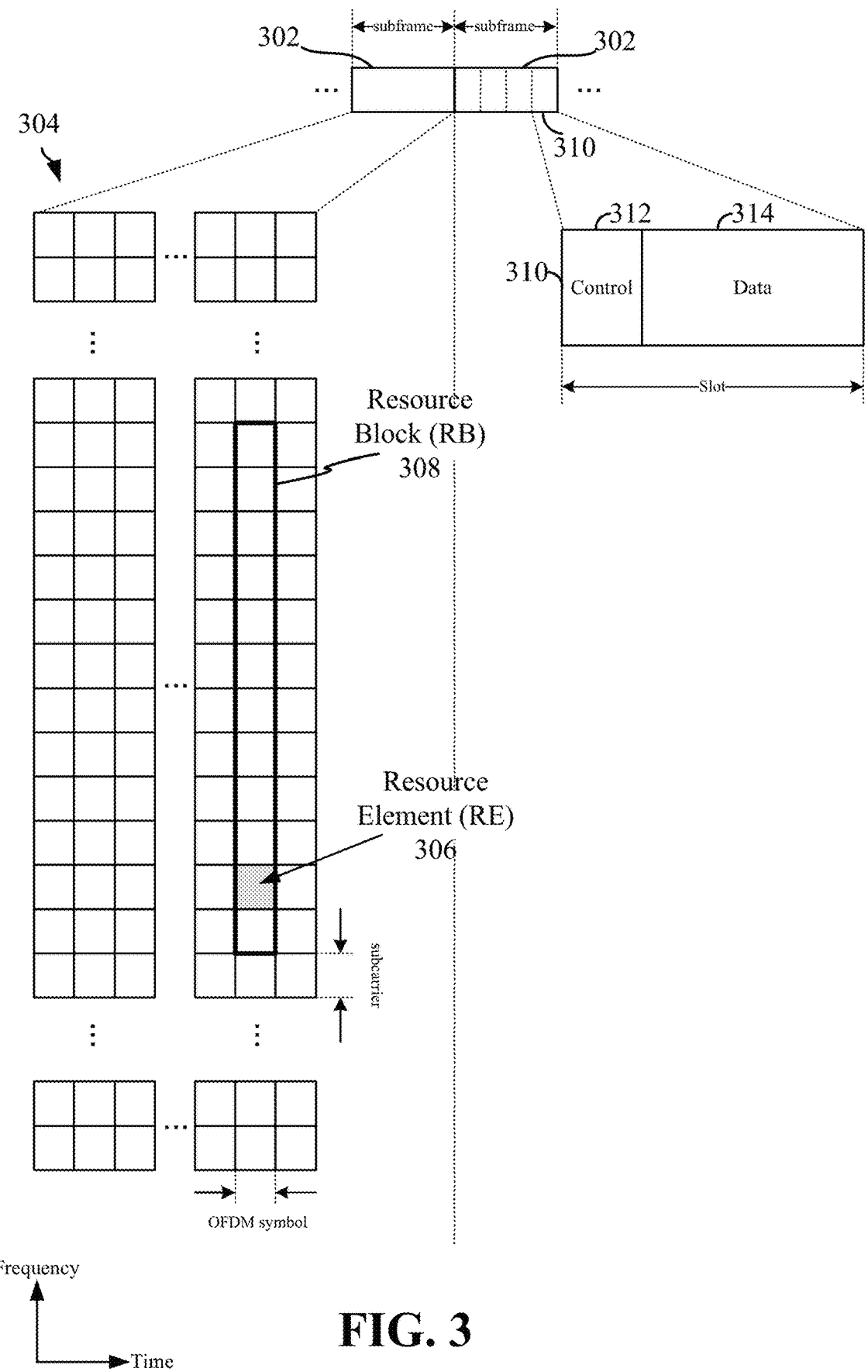
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). The mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station or other network node) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in an SSB. The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
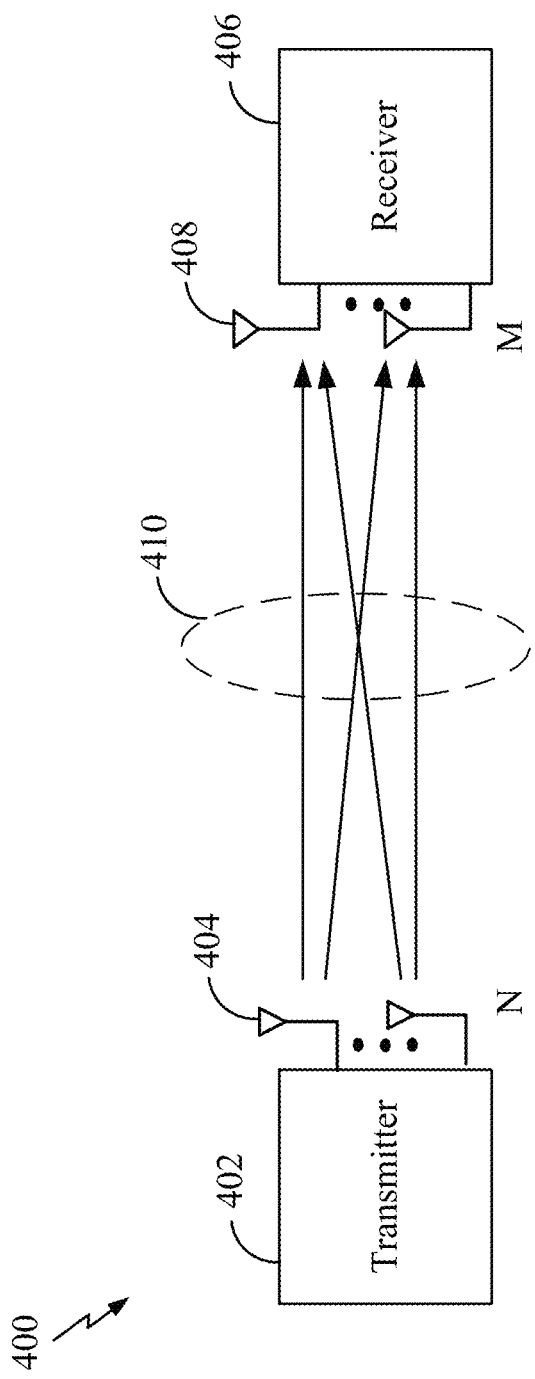
FIG. 4 is a block diagram illustrating a wireless communication system supporting beamforming and/or multiple-input multiple-output (MIMO) communication according to some aspects.

In some aspects of the disclosure, the access terminal, e.g., UE, scheduled entity, scheduling entity, etc. may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G NR systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

As noted above, aspects of the present disclosure provide various apparatus, methods, and systems that provide for beam-specific array gain adjustments to address these or other issues. The beam-specific array gain adjustments will now be described in detail with reference to the remaining figures.

Figure 5:
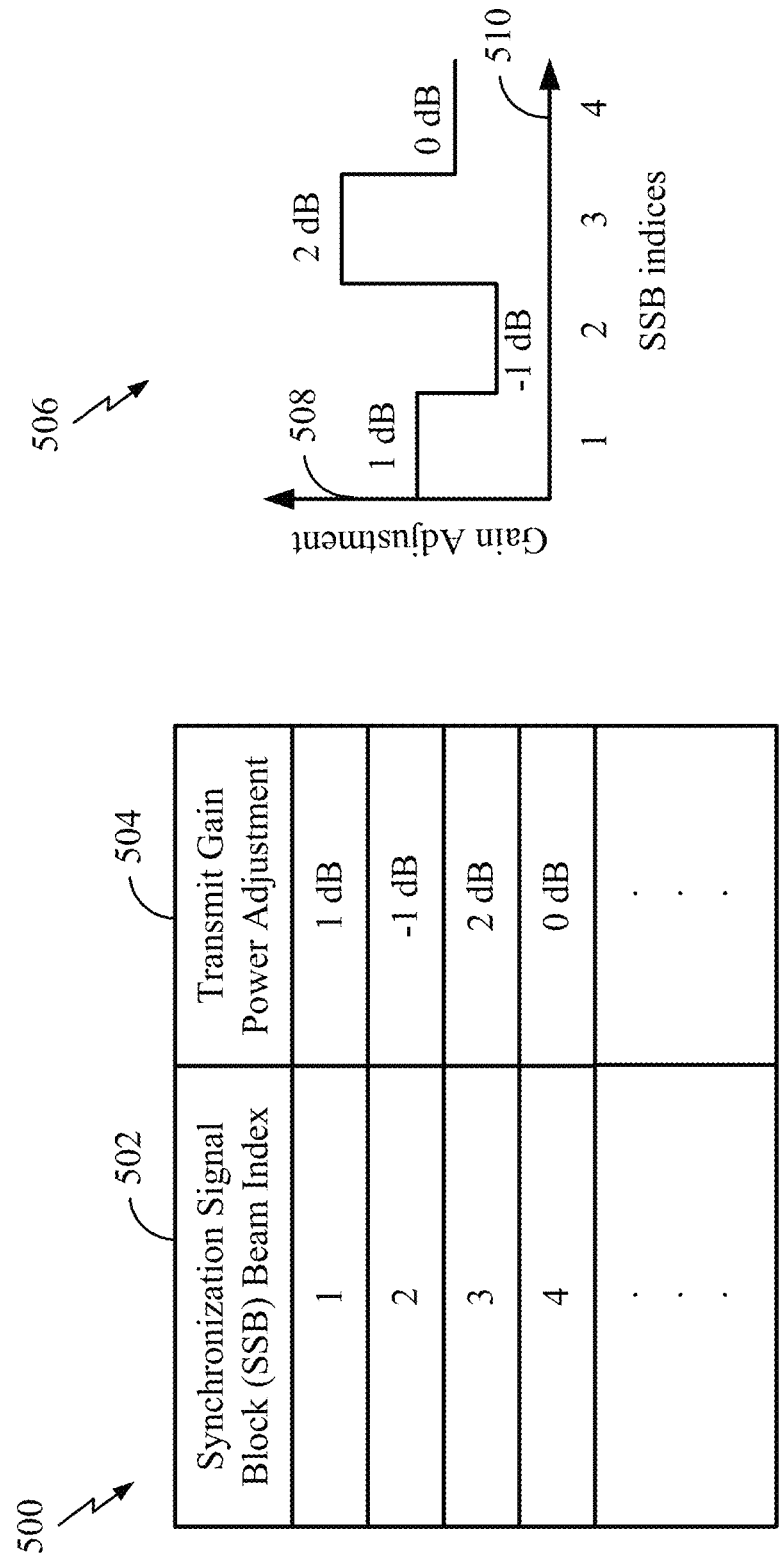
FIG. 5 is a diagram illustrating exemplary beam-specific gain adjustments in accordance with some aspects.

FIG. 5 illustrates a beam-specific gain adjustment table 500 that may be stored in, for example, a network node or scheduling device, wherein the table provides different beam-specific array gain (power) adjustments for different SSBs. A first column 502 stores the SSB beam index, 1, 2, 3, 4, . . . , etc., and a second column 504 stores a corresponding beam-specific transmit power adjustment value in dB. In the example of FIG. 5, the beam-specific transmit power adjustment values are specified in whole numbers (e.g., 1 dB, -1 dB, etc.) but more precise values may be specified, such as values with decimal or fractional components (e.g., 1.25 dB, -1.5 dB, etc.). FIG. 5 also provides a graph 506 showing the beam-specific gain adjustments as a function of increasing SSB index, with the adjustments in dB represented along the vertical axis 508 of the graph and the SSD index represented along the horizontal axis 510. The exemplary values in FIG. 5 are merely illustrative. Other tables may instead provide beam-specific gain adjustments for CSI-RS/SRS resource sets.

The network node may be provided with multiple tables or sub-tables providing different beam-specific adjustment values for use with different sets of beamforming parameters. For example, a set of tables or sub-tables may be provided that store predetermined beam-specific adjustment values that may vary based on a variety of parameters, such as: a carrier frequency; a bandwidth; a number of beams specified within one or more of an SSB burst set or CSI-RS/SRS resource set; an intended coverage area of the network node; a phase shift resolution of phase shifters used at the network node; an amplitude resolution of the gain control associated with the antenna elements used at the network node; and an array size or geometry of an antenna array of the network node. Multi-dimensional tables or data storage arrays may be used to provide different gain adjustments for various combinations of parameters, such as for a particular carrier frequency and array size combination. Moreover, as will be explained more fully below, additional or different tables may be stored within access terminals or devices, such as UEs. Alternatively, rather than providing tables or data storage arrays, various gain adjustments might be represented using parameterized formulae to allow the device to compute a particular gain adjustment for a particular combination of parameters.

Hence, in some aspects, a network node or other wireless device determines a set of beam-specific gain adjustments to use by selecting a particular set of adjustment values from within its tables or formulae based on one or more of: a carrier frequency; a bandwidth; a number of beams specified within one or more of an SSB burst set or a CSI-RS/SRS resource set; an intended coverage area of the network node; a phase shift resolution of the phase shifters used at the network node; an amplitude resolution of the gain control associated with the antenna elements used at the network node; and an array size or geometry of an antenna array of the network node.

Once the appropriate set of beam-specific gain adjustments has been determined, the wireless device may then apply the values during SSB procedures or the like. The following figures provide various examples.

Figure 6:
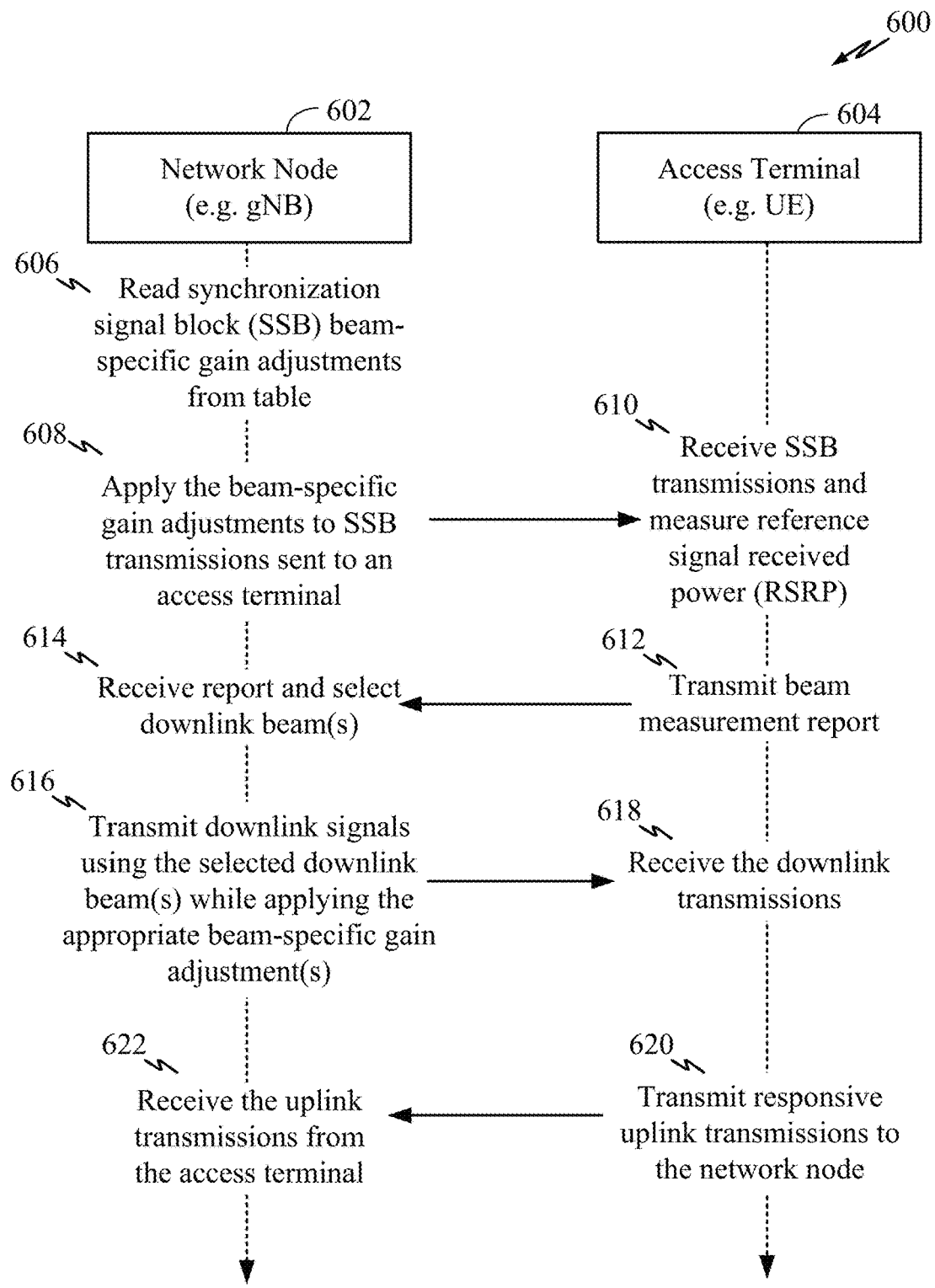
FIG. 6 is a flow chart illustrating an exemplary wireless communication method for use by a network node and an access terminal that exploits beam-specific gain adjustments in accordance with some aspects.

FIG. 6 is a timing diagram 600 of an illustrative example wherein SSB beam-specific gain adjustments are applied by a network node 602 (e.g., a gNB) for use with beamformed wireless transmissions to an access terminal 604 (e.g., a UE). These adjustments may be referred to as network-side adjustments since the adjustments are applied by the network node. It should be appreciated that the timing diagram of FIG. 6 and the other timing diagrams described herein do not illustrate all of the various signals that may be exchanged between a network node and an access terminal to set up and maintain wireless communications. Rather, the diagrams highlight features relevant to beam-specific array gain adjustments.

At 606, the network node 602 reads SSB beam-specific gain adjustments from a table maintained within a memory of the network node 602. As explained, the table may include a beam-specific gain adjustment value in dB for each different SSB index for use with beamformed transmissions. At 608, the network node 602 applies the beam-specific gain adjustments to SSB transmissions sent to one or more access terminals in its vicinity. Hence, different SSBs may have their transmit power selectively increased or decreased based on the gain adjustment values read from the table. At 610, the access terminal 604 receives the SSB transmissions and measures RSRP or other suitable values such as reference signal received quality (RSRQ) values. At 612, the access terminal 604 transmits a beam measurement report or the like to the network node. At 614, the network node 602 receives the report and selects one or more downlink beam(s) for further communications with the access terminal 604. At 616, the network node 602 transmits downlink signals using the selected downlink beam(s) while applying the appropriate beam-specific gain adjustment(s) to the selected downlink beam(s). At 618, the access terminal 604 receives the downlink transmissions and, at 620, the access terminal 604 transmits responsive uplink transmissions to the network node. At 622, the network node 602 receives the uplink transmissions from the access terminal. Although not shown, additional uplink and downlink signals may be exchanged and, if the access terminal 604 moves relative to the network node 602, the process may be repeated to select a different SSB beam. Among other features, FIG. 6 provides the technical advantage of enabling beam-specific gain adjustments to address the issues noted above.

Hence, FIG. 6 illustrates an example wherein the beam-specific gain adjustments are applied to SSBs. In other examples, additional or alternative beam-specific gain adjustments may be applied via CSI-RS/SRS. A hierarchical or multi-stage procedure may be employed that begins with SSB and then refines the beams using CSI-RS/SRS. The gain adjustments may be applied at various stages of the refinement procedure and, in some examples, are applied at one or more intermediate stages. The gain adjustments may apply to or relate to a variety of beamforming spatial direction parameters or spatial orientation parameters, such as peak gain direction, beam-width, side lobe levels, side lobe directions, beam nulls and null directions, grating lobes and grating lobe directions.

In the following, illustrative alternative embodiments are described wherein, for example, the network node transmits data from the beam-specific gain adjustment table to the access terminals in the vicinity so that the access terminals may apply the adjustments to received SSBs. In other examples, a first set (portion) of the beam-specific gain adjustments are applied at the network node and a second set (portion) of the beam-specific gain adjustments are applied at the access terminal. For example, SSB-based adjustments may be applied by the network node, whereas CSI-RS/SRS-based adjustment may be applied by the access terminal for receive-side refinements (assuming the access terminal is configured for beamforming). Moreover, it should be understood that a particular device such as a UE may be an access terminal for some purposes and a network node for other purposes. Hence, a particular device may be configured to perform both network node-based gain adjustments and access terminal-based gain adjustments.

Figure 7:
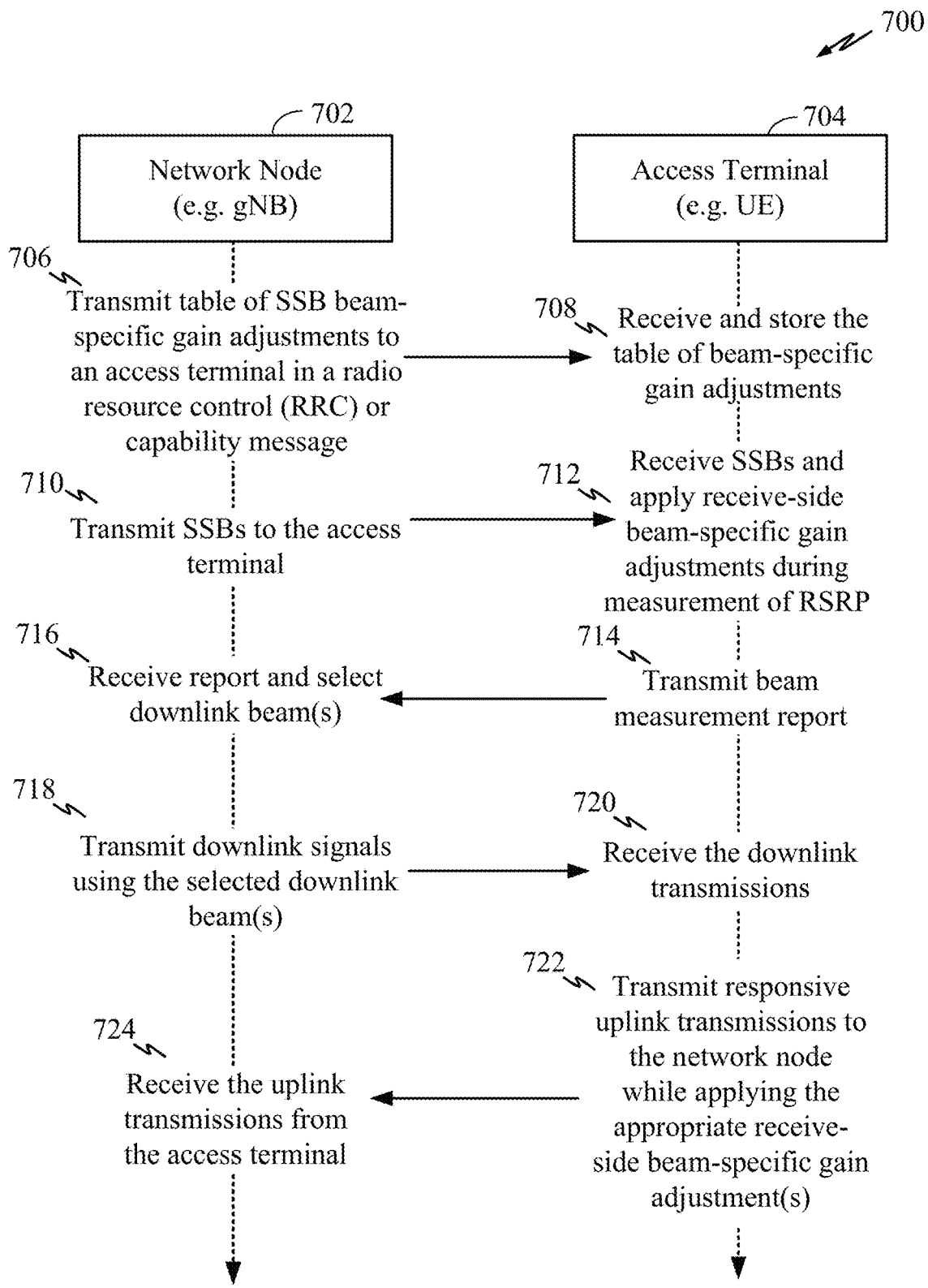
FIG. 7 is a flow chart illustrating another exemplary wireless communication method for use by a network node and an access terminal that exploits beam-specific gain adjustments in accordance with some aspects.

FIG. 7 is a timing diagram 700 of an illustrative example wherein the SSB beam-specific gain adjustments are transmitted by a network node 702 (e.g., a gNB) to an access terminal 704 (e.g., a UE) for use by the access terminal 704. These adjustments may be referred to as receive-side adjustments since they are applied by the component receiving a transmitted copy of the gain adjustments. At 706, the network node 702 reads SSB beam-specific gain adjustments from a table maintained within a memory of the network node 702 and transmits the information in the table to the access terminal 704 and other devices in the coverage area. The data may be transmitted, for example, within a radio resource control (RRC) message or a capability message. At 708, the access terminal 704 receives and stores the table of beam-specific gain adjustments within its internal memory for use as receive-side adjustments. At 710, the network node 702 transmits SSBs to the access terminal 704 and other devices in the coverage area. The SSBs do not have their gains adjusted (as in FIG. 6). At 712, the access terminal 704 receives one or more of the SSBs and applies the receive-side beam-specific gain adjustments during measurement of RSRP (or other related parameters). Hence, for example, the RSRP for a particular SSB may be adjusted to reflect the corresponding gain adjustment specified in the table for that SSB index. In this manner, the network node 702 does not adjust its SSB transmit power; rather the access terminal 704 compensates during the measurement of signal strength. At 714, the access terminal 704 transmits a beam measurement report or the like to the network node (where the report reflects the adjusted RSRP). At 716, the network node 702 receives the report and selects one or more downlink beam(s) for further communications with the access terminal 704. At 718, the network node 702 transmits downlink signals using the selected downlink beam(s). At 720, the access terminal 704 receives the downlink transmissions and, at 722, the access terminal 704 transmits responsive uplink transmissions to the network node 702 while applying the appropriate receive-side beam-specific gain adjustment(s) from its table to selected downlink beam(s). At 724, the network node 702 receives the uplink transmissions from the access terminal. In this manner, the network node 702 does not adjust its downlink transmit power; rather the access terminal 704 compensates during transmission of uplink signals. Although not shown, additional signals may be exchanged and, if the access terminal 704 moves relative to the network node 702, the process may be repeated.

Insofar as hierarchal beam management is concerned, a beam management procedure may be provided that employs, for example, three stages or processes (P1, P2, and P3). Within P1, the network node (e.g., gNB) sweeps an SSB beam and the access terminal (e.g., UE) identifies a best SSB beam and reports the beam to the network node. Within P2, a first level of beam refinement is performed using CSI-RS (or SRS), wherein the network node sweeps with a narrower beam over a narrower range and access terminal identifies the best of the narrower beams and reports the beam to the network node. Within P3, a second level of refinement is performed wherein the network node fixes its beam and transmits the same fixed beam repeatedly. The access terminal refines the receive beam of the access terminal by, e.g., setting a spatial filter on the receive antenna array. Within such a hierarchal beam management procedure, beam-specific gain adjustments may be employed at any or all of the stages of the processes.

Figure 8:
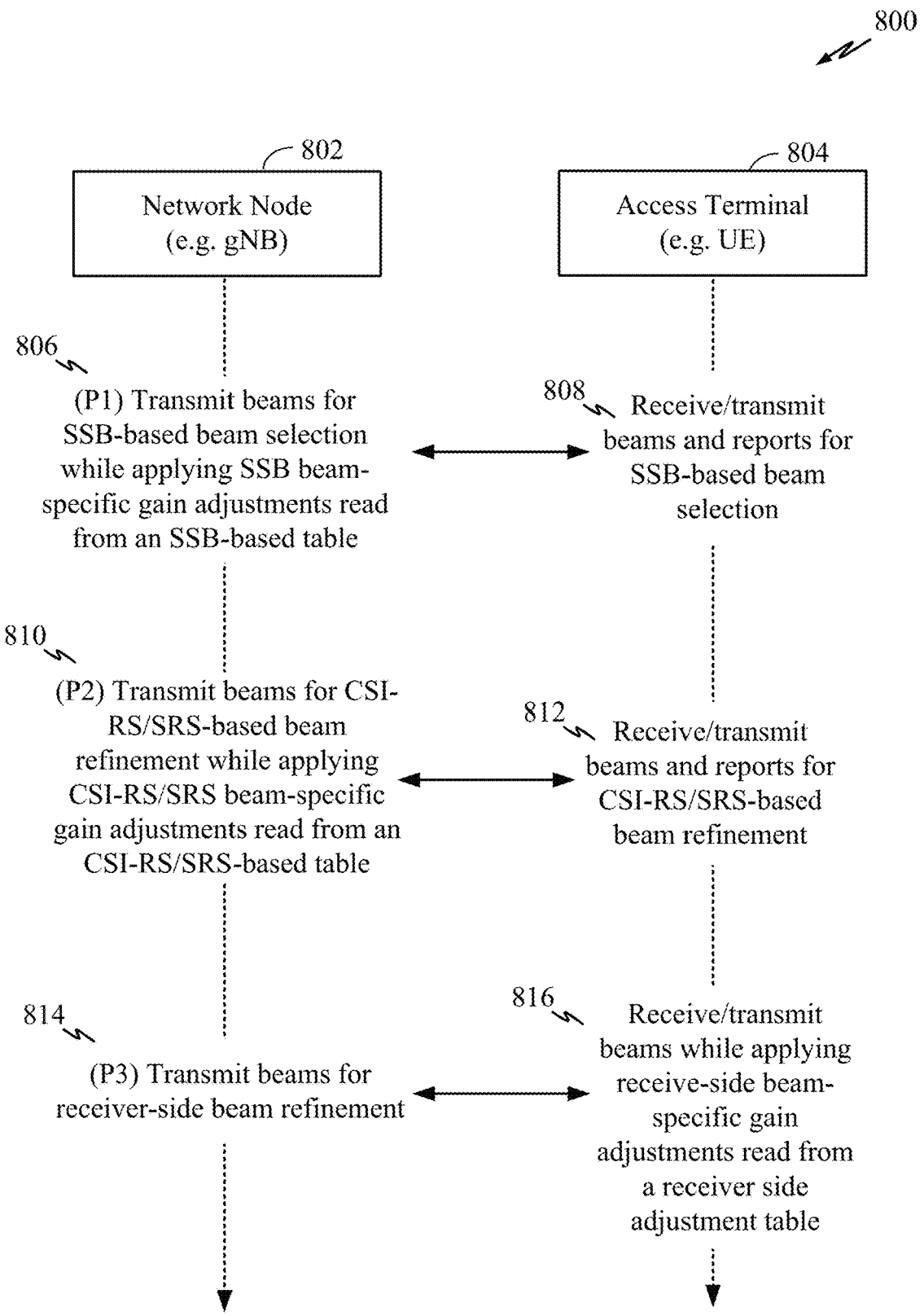
FIG. 8 is a flow chart illustrating yet another exemplary wireless communication method for use by a network node and an access terminal that exploits beam-specific gain adjustments in accordance with some aspects.

FIG. 8 is a timing diagram 800 of an illustrative hierarchical-based beam management example wherein SSB-based beam-specific gain adjustments are applied by a network node 802 (e.g., a gNB) and receive-side beam-specific gain adjustments are applied by an access terminal 804 (e.g., a UE). At 806, during P1, the network node 802 transmit beams for SSB-based beam selection while applying SSB beam-specific gain adjustments read from an SSB-based gain adjustment table. At 808, the access terminal 804 receives/transmits responsive beams and reports for SSB-based beam selection. As already explained, RSRP values may be measured and reported. At 806, during P2, the network node 802 transmits beams for CSI-RS/SRS-based beam refinement while applying CSI-RS/SRS beam-specific gain adjustments read from a CSI-RS/SRS-based gain adjustment table. At 812, the access terminal 804 receives/transmits responsive beams and reports for CSI-RS/SRS-based beam refinement. At 814, during P3, the network node 802 transmits beams for receive-side beam refinement. At 816, the access terminal 804 receives/transmits beams while applying receive-side beam-specific gain adjustments read from a receive-side beam-specific gain adjustment table.

In the example of FIG. 8, beam-specific gain adjustments are employed at all of the three stages of the processes. In other examples, the beam-specific gain adjustments may be employed only during one or two of the stages such as during P2 but not during P1 or P3. In still other examples, additional beam refinement stages might be provided, with beam-specific gain adjustments selectively provided at any or all of the stages. Among other features, FIG. 8 provides a further technical advantage of refining the beam-specific gain adjustments to even more effectively address the issues noted above.

Figure 9:
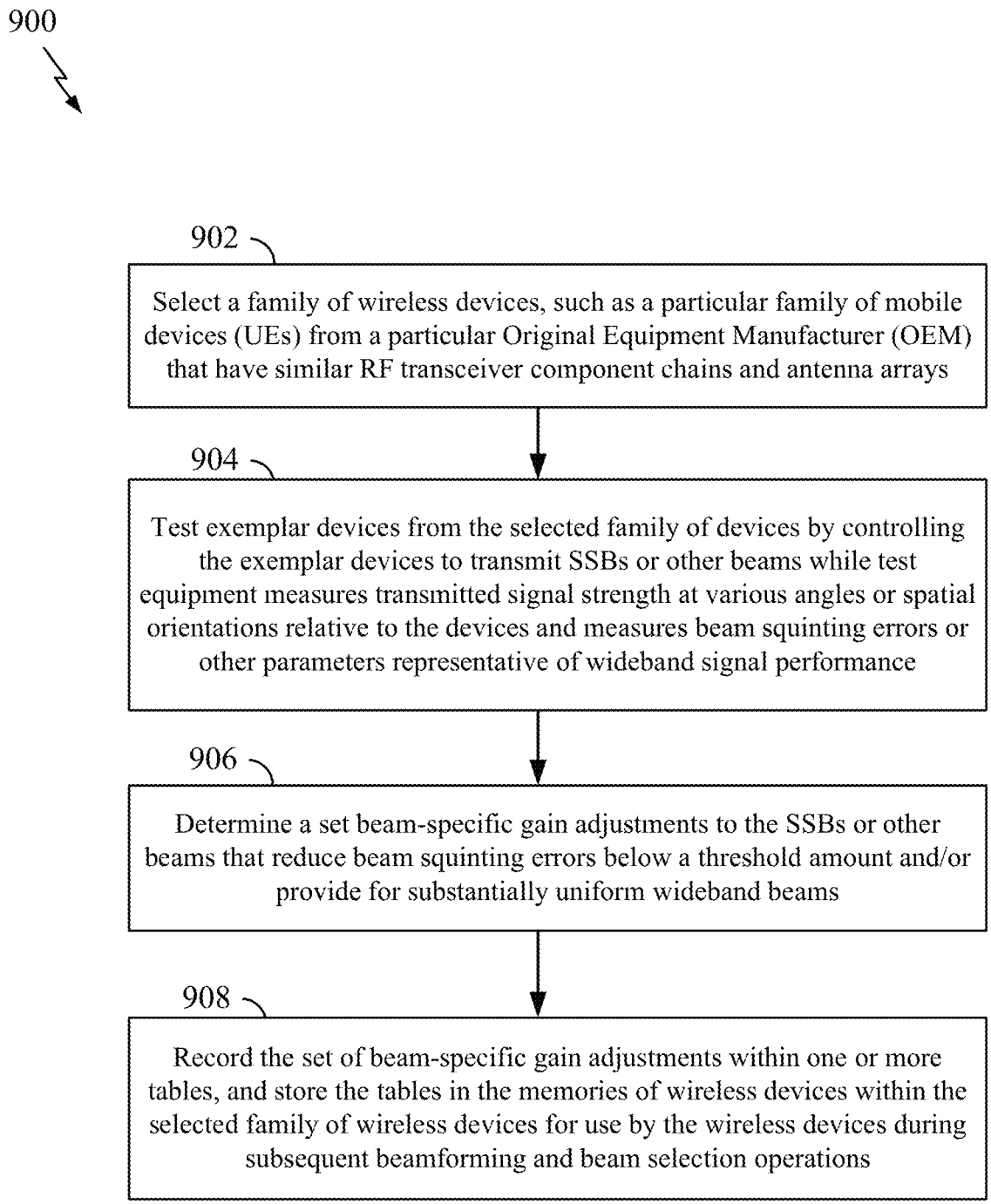
FIG. 9 is a flow chart illustrating a method for determining beam-specific gain adjustments for a family of wireless devices in accordance with some aspects.

FIG. 9 illustrates an exemplary procedure for determining beam-specific adjustments for use within particular families of wireless devices. The procedure of FIG. 9 may be performed after a family of wireless devices has been designed by a particular wireless device manufacturer, such as after a new family of mobile telephones has been designed or a new family of base stations has been designed. Beginning at 902, test engineers or automated test systems select a family of wireless devices, such as a particular family of mobile devices from a particular device OEM that have similar or identical RF transceiver component chains and antenna arrays. For example, the family of wireless devices may be a family of mobile phones from an OEM that may differ from one another in terms of the processor power or display resolution but use the same antenna arrays and RF transceiver components and hence are expected to exhibit the same or substantially similar RF transmission characteristics. At 904, the test engineers or automated test systems test one or more exemplar devices from the selected family of devices by controlling the exemplar devices to transmit SSBs or other beams while test equipment measures the transmitted signal strength at various angles or spatial orientations relative to the device and measures beam squinting errors or other parameters representative of wideband signal performance. At 906, the test engineers or automated test systems test determine a set beam-specific gain adjustments to the SSBs or other beams that reduce beam squinting errors below a threshold amount and/or provide for substantially uniform wideband beams as quantified by other measured performance parameters. At 908, the test engineers or automated test systems record the set of beam-specific gain adjustments within one or more tables for subsequent storage in the memories of wireless devices within the selected family of wireless devices for use by the wireless devices during subsequent beamforming and beam selection operations.

As already explained, different tables or sub-tables may be indicated that provide beam-specific adjustment values dependent on a variety of parameters, such as: frequency of interest; a carrier frequency; a bandwidth; a number of beams specified within one or more of an SSB burst set or a CSI-RS/SRS resource set; an intended coverage area; a phase shift resolution; an amplitude resolution; an array size or geometry of an antenna array of the network node, etc. For example, one set of beam-specific adjustment values may be determined and stored for use with one carrier frequency, whereas a different set of beam-specific adjustment values may be determined and stored for use with a different carrier frequency. Thereafter, in use, a particular wireless device looks up the appropriate beam-specific adjustment values for the particular carrier frequency the device intends to use within a particular coverage area.

Figure 10:
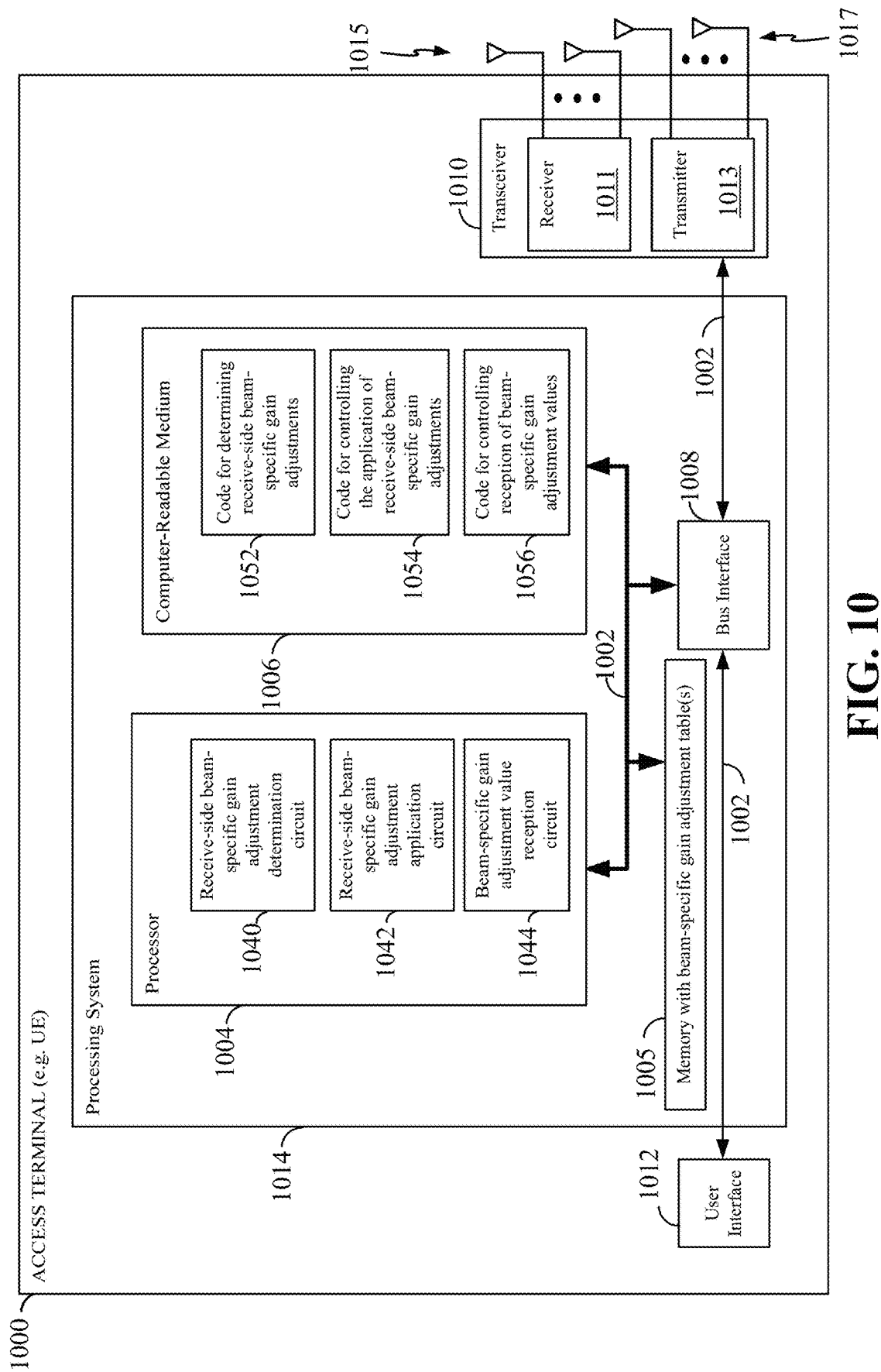
FIG. 10 is a block diagram illustrating an example of a hardware implementation for an access terminal in accordance with some aspects.

FIG. 10 is a block diagram illustrates an example of a hardware implementation for an access terminal 1000 employing a processing system 1014 capable of controlling and performing beam-specific gain adjustments according to some aspects. The access terminal 1000 may be one or more of a scheduled entity, a UE, a customer premises equipment (CPE), a relay, a sidelink node, and an integrated access and backhaul (IAB) node. The access terminal 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the access terminal 1000 may be configured to perform any one or more of the functions described herein. That is, the processor 1004, as utilized in an access terminal 1000, may be used to implement any one or more of the processes and procedures described elsewhere herein.

In the example of FIG. 10, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. The transceiver 1010 includes a receiver 1011 and a transmitter 1013. The receiver 1011 is coupled to a set of antennas 1015. The transmitter 1013 is coupled to a set of antennas 1017. The sets of antennas may be used for beamforming. Moreover, as explained above, the receiver and transmitter may have separate gains, which can be separately measured. Depending upon the nature of the apparatus, a user interface 1012 (e.g., keypad, display, speaker, microphone, joystick) may also be provided.

In some aspects of the disclosure, the processor 1004 may include circuitry configured to implement one or more of the functions described elsewhere herein. The processor 1004 may include, for example, a receive-side beam-specific gain adjustment determination circuit 1040, a receive-side beam-specific gain adjustment application circuit 1042, and a beam-specific gain adjustment value reception circuit 1044.

In some aspects, the receive-side beam-specific gain adjustment determination circuit 1040 may comprise processing circuitry configured to: determine beam-specific gain adjustments for use with a plurality of wireless communication beams of the access terminal that have different beamformed spatial orientation parameters, which may include selecting a set of predetermined beam-specific gain adjustments stored within beam-specific gain adjustment table(s) in memory 1005 based on one or more of: a carrier frequency; a bandwidth; a number of beams specified within one or more of a SSB burst set or a CSI-RS/SRS resource set; an intended coverage area of the access terminal; a phase shift resolution of the phase shifters used at the access terminal; an amplitude resolution of the gain control associated with the antenna elements used at the access terminal; and an array size or geometry of an antenna array of the access terminal, in accordance with aspects of the procedures of FIGS. 6-9.

In some aspects, the receive-side beam-specific gain adjustment application circuit 1042 may comprise processing circuitry configured to: apply beam-specific gain adjustments to wireless communications with the network node such as to beamformed uplink signals transmitted to the network node and/or apply beam-specific gain adjustments received from a network node to beamformed downlink wireless communication signals, in accordance with aspects of the procedures of FIGS. 6-9.

In some aspects, the beam-specific gain adjustment value reception circuit 1044 may comprise processing circuitry configured to control the transceiver 1010 to receive beam-specific gain adjustments from a network node for use with a plurality of wireless communication beams, wherein the wireless communication beams have one or more different beamformed spatial orientation parameters, in accordance with aspects of the procedures of FIGS. 6-9.

Hence, as shown, the access terminal 1000 may be configured to receive beam-specific gain adjustments from a network node and/or determine beam-specific gain adjustments by accessing memory 1005.

The processor 1004 is also responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable storage medium 1006 may include software configured to implement one or more of the functions described elsewhere herein. For example, the computer-readable storage medium 1006 may include code 1052 for determining beam-specific gain adjustments such as determining additional beam-specific gain adjustments for use with the plurality of wireless communication beams, code 1054 for controlling the application of beam-specific gain adjustments to wireless communications with the network node, and code 1056 for controlling reception of beam-specific gain adjustments from a network node for use with a plurality of wireless communication beams, wherein the wireless communication beams have one or more different beamformed spatial orientation parameters.

In some aspects, the receive-side beam-specific gain adjustment determination circuit 1040 provides a means for determining beam-specific gain adjustments for use with a plurality of wireless communication beams, wherein the wireless communication beams have one or more different beamformed spatial orientation parameters. The receive-side beam-specific gain adjustment application circuit 1042 provides a means for applying the receive-side beam-specific gain adjustments to wireless communications with the network node. The beam-specific gain adjustment value reception circuit 1044 provides a means for receiving beam-specific gain adjustments from a network node for use with a plurality of wireless communication beams, wherein the wireless communication beams have one or more different beamformed spatial orientation parameters.

Figure 11:
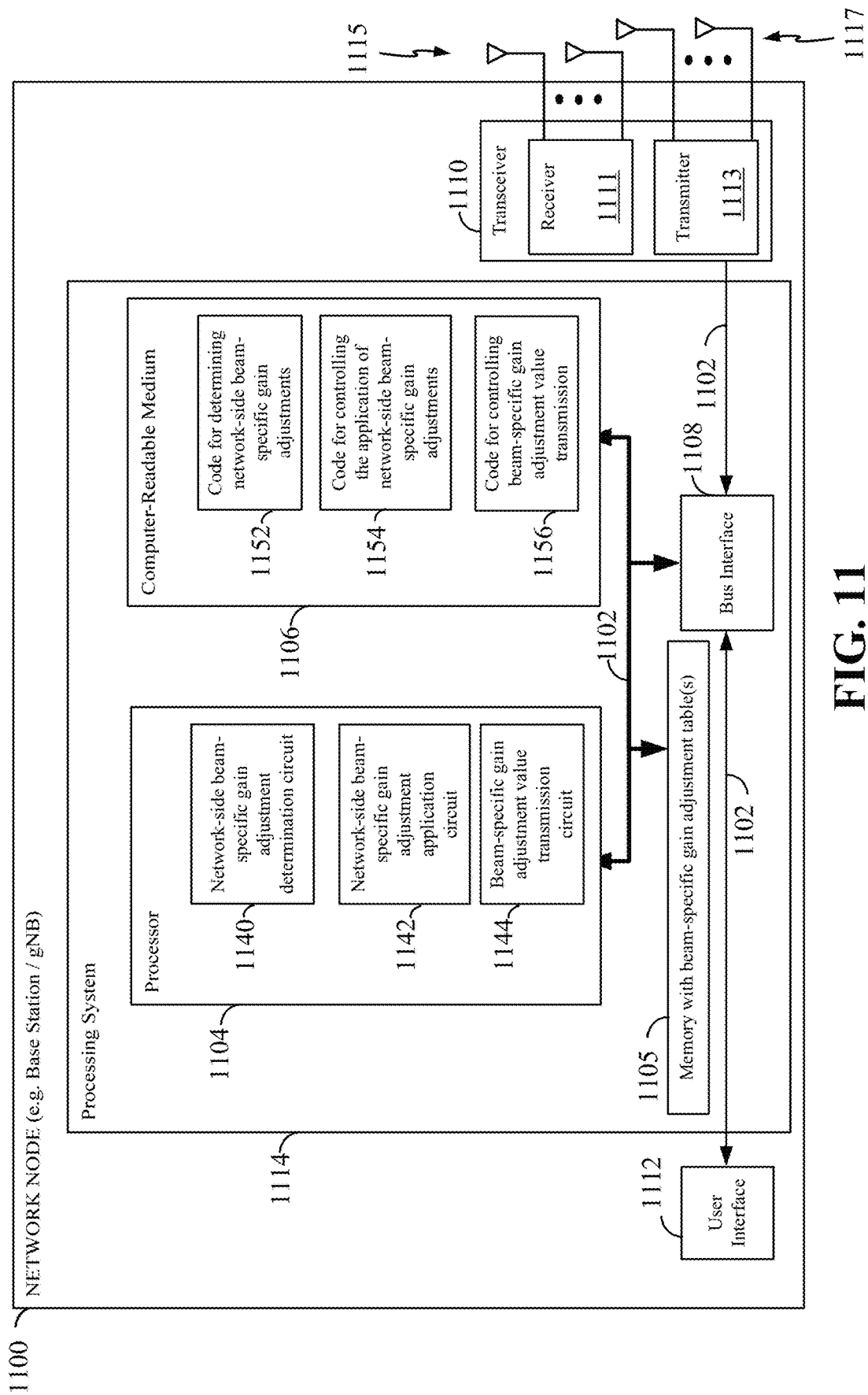
FIG. 11 is a block diagram illustrating an example of a hardware implementation for a network node in accordance with some aspects.

FIG. 11 is a block diagram illustrating an example of a hardware implementation for an exemplary network node 1100, e.g., a base station, employing a processing system 1114. The network node 1100 may be one or more of a scheduling entity, gNB, a TRP, an IAB node, and a repeater node. In accordance with various aspects of the disclosure, an element, or any portion of an element, or any combination of elements may be implemented with a processing system 1114 that includes one or more processors 1104. For example, the network node 1100 may be a gNB as illustrated in any one or more of the other figures.

The processing system 1114 may be generally similar to the processing system 814 illustrated in FIG. 10, including a bus interface 1108, a bus 1102, memory 1105, a processor 1104, a computer-readable medium 1106, a user interface 1112, and a transceiver 1110 (a communication interface) similar to those described above, and so many of the details of the system architecture will not be described again. The transceiver 1110 includes a receiver 1111 and a transmitter 1113. The receiver 1111 is coupled to a set of antennas 1115. The transmitter 1113 is coupled to a set of antennas 1117. The sets of antennas may be used for beamforming. Moreover, as explained above, the receiver and transmitter may have separate gains, which can be separately measured.

The processor 1104, as utilized in a network node 1100, may be used to implement one or more of the various processes described herein for use by access terminals. In some aspects of the disclosure, the processor 1104 includes a network-side beam-specific gain adjustment determination circuit 1140, a network-side beam-specific gain adjustment application circuit 1142, and a beam-specific gain adjustment value transmission circuit 1144.

In some aspects, the network-side beam-specific gain adjustment determination circuit 1140 may comprise processing circuitry configured to: determine beam-specific gain adjustments for use with a plurality of wireless communication beams, wherein the wireless communication beams have one or more different beamformed spatial orientation parameters, which may include selecting a set of predetermined beam-specific gain adjustments stored within beam-specific gain adjustment table(s) in memory 1105 based on one or more of: a carrier frequency; a bandwidth; a number of beams specified within one or more of a SSB burst set or a CSI-RS/SRS resource set; an intended coverage area of the network node; a phase shift resolution of the network node; an amplitude resolution of the network node;

and an array size or geometry of an antenna array of the network node, in accordance with aspects of the procedures of FIGS. 6-9.

In some aspects, the network-side beam-specific gain adjustment application circuit 1142 may comprise processing circuitry configured to: apply the beam-specific gain adjustments to wireless communications with an access terminal, such as to beamformed downlink wireless communication signals transmitted to the access terminal, in accordance with aspects of the procedures of FIGS. 6-9.

In some aspects, the beam-specific gain adjustment value transmission circuit 1144 may comprise processing circuitry configured to control the transceiver 1110 to transmit beam-specific gain adjustments to an access terminal for use with a plurality of wireless communication beams, wherein the wireless communication beams have one or more different beamformed spatial orientation parameters, in accordance with aspects of the procedures of FIGS. 6-9.

The computer-readable storage medium 1106 may include software configured to implement one or more of the functions described elsewhere herein. For example, the computer-readable storage medium 1106 may include code 1152 for determining beam-specific gain adjustments for use with a plurality of wireless communication beams, wherein the wireless communication beams have one or more different beamformed spatial orientation parameters, code 1154 for controlling the application of beam-specific gain adjustments to wireless communications with an access terminal, and code 1156 for controlling transmission of beam-specific gain adjustment values.

In some aspects, the network-side beam-specific gain adjustment determination circuit 1140 provides a means for determining beam-specific gain adjustments for use with a plurality of wireless communication beams, wherein the wireless communication beams have one or more different beamformed spatial orientation parameters. The network-side beam-specific gain adjustment application circuit 1142 provides a means for applying the beam-specific gain adjustments to wireless communications with an access terminal. The beam-specific gain adjustment value transmission circuit 1144 provides a means for transmitting beam-specific gain adjustments from a network node for use with a plurality of wireless communication beams, wherein the wireless communication beams have one or more different beamformed spatial orientation parameters.

Figure 12:
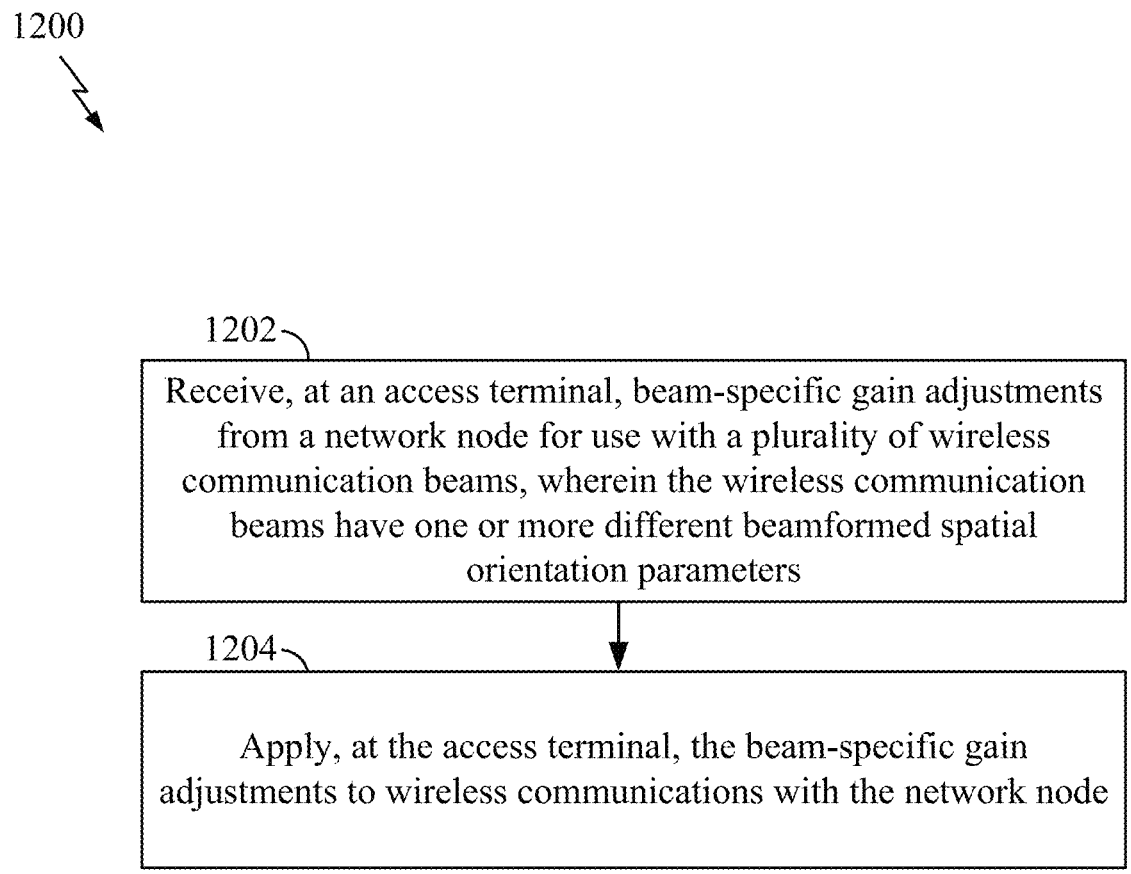
FIG. 12 is a flow chart illustrating an exemplary wireless communication method for use by an access terminal in accordance with some aspects.

FIG. 12 is a flow chart illustrating a wireless communication method 1200 according to some aspects of the disclosure. The communication method 1200 may be performed, for example, by any of the access terminals illustrated in the figures, such as a UE, or by other suitably-equipped systems, devices or apparatus including a wireless communication device. At block 1202, the access terminal (e.g., the receive-side beam-specific gain adjustment determination circuit 1040 of access terminal 1000 of FIG. 10) receives beam-specific gain adjustments from a network node for use with a plurality of wireless communication beams, wherein the wireless communication beams have one or more different beamformed spatial orientation parameters. At block 1204, the access terminal (e.g., the receive-side beam-specific gain adjustment application circuit 1042 of access terminal 1000 of FIG. 10) applies the beam-specific gain adjustments to wireless communications with a network node (e.g., by, for example, controlling the transceiver 1010 of the access terminal 1000 of FIG. 10). Exemplary details of these operations are discussed above in connection with FIGS. 6-9.

Figure 13:
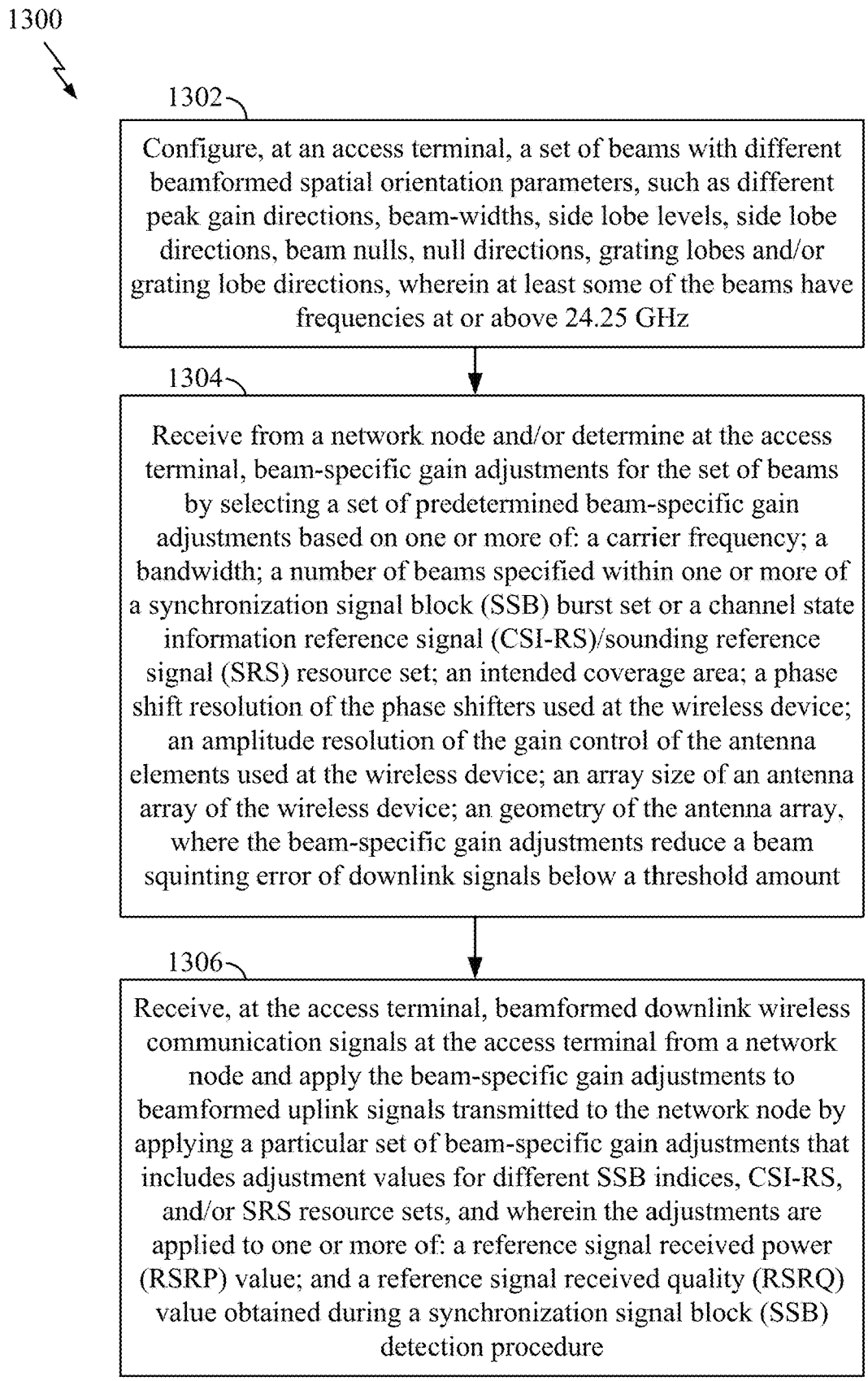
FIG. 13 is a flow chart illustrating further features of an exemplary wireless communication method for use by an access terminal in accordance with some aspects.

FIG. 13 is a flow chart illustrating aspects of a wireless communication method 1300 according to some aspects of the disclosure. The communication method 1300 may be performed, for example, by any of the access terminals illustrated in the figures, such as the UE 1000 of FIG. 10, or by other suitably-equipped systems, devices or apparatus. At block 1302, the access terminal configures a set of beams with different beamformed spatial orientation parameters, such as different peak gain directions, beam-widths, side lobe levels, side lobe directions, beam nulls, null directions, grating lobes and/or grating lobe directions, wherein at least some of the beams have frequencies at or above 24.25 GHz. At block 1304, the access terminal (a) receives from a network node and/or (b) determines at the access terminal beam-specific gain adjustments by, e.g., selecting a set of predetermined beam-specific gain adjustments based on one or more of: a carrier frequency; a bandwidth; a number of beams specified within one or more of an SSB burst set or a CSI-RS/SRS) resource set; an intended coverage area; a phase shift resolution of the phase shifters used at the wireless device; an amplitude resolution of the gain control of the antenna elements used at the wireless device; an array size of an antenna array of the wireless device; a geometry of the antenna array of the wireless device, where the beam-specific gain adjustments reduce a beam squinting error of downlink wireless communication signals below a threshold amount. Hence, in some examples, the beam-specific gain adjustments may be determined by the network node and then sent to the access terminal for storage and use therein or the beam-specific gain adjustments may be determined by the access terminal. In some aspects, some of the adjustments may be determined by the network node and others by the access terminal. As already explained, the adjustments may be transmit gain power adjustments.

At block 1306, the access terminal receives beamformed downlink wireless communication signals from a network node (such as base station 1100 of FIG. 11) and applies the beam-specific gain adjustments to beamformed uplink signals transmitted to the network node by applying a particular set of beam-specific gain adjustments that includes adjustment values for different SSB indices, CSI-RS, and/or SRS resource sets, and wherein the adjustments are applied to one or more of: an RSRP value; and a RSRQ value obtained during an SSB detection procedure.

Figure 14:
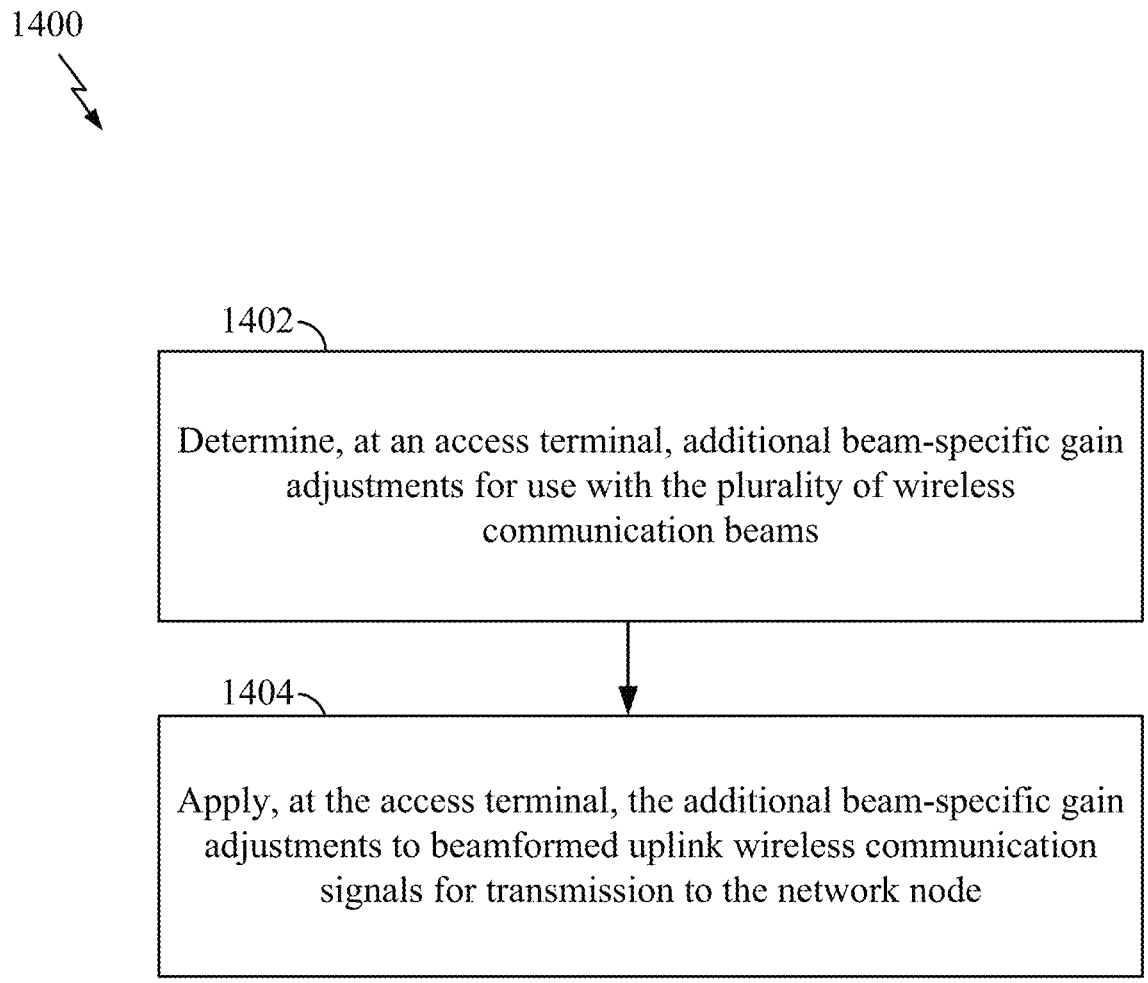
FIG. 14 is a flow chart illustrating still further features of an exemplary wireless communication method for use by an access terminal in accordance with some aspects.

FIG. 14 is a flow chart illustrating aspects of a wireless communication method 1400 according to some aspects of the disclosure. The communication method 1300 may be performed, for example, by any of the access terminals illustrated in the figures, such as the UE 1000 of FIG. 10, or by other suitably-equipped systems, devices or apparatus. At block 1402, the access terminal determines additional beam-specific gain adjustments for use with the plurality of wireless communication beams, which may be, for example, additional adjustments beyond those determined using the method of FIG. 13. At block 1304, the access terminal applies the additional beam-specific gain adjustments to beamformed uplink wireless communication signals for transmission to the network node.

Figure 15:
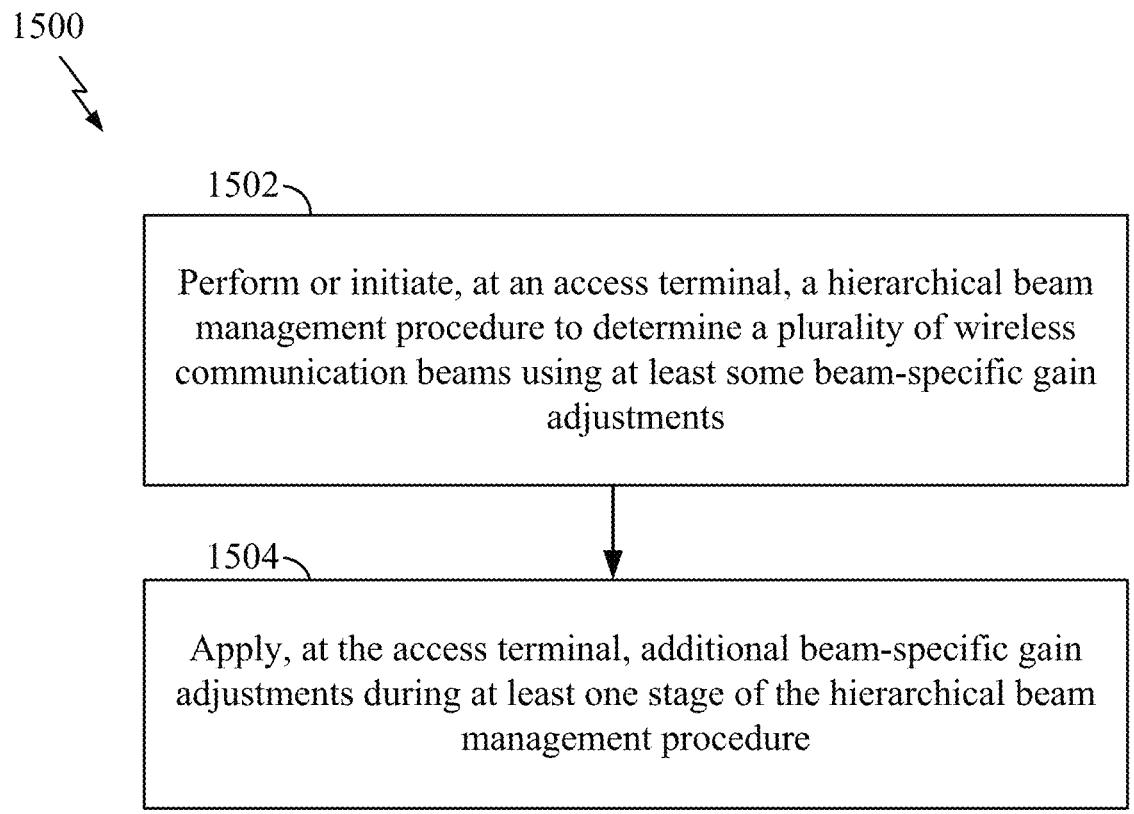
FIG. 15 is a flow chart illustrating still further features of an exemplary wireless communication method for use by an access terminal in accordance with some aspects.

FIG. 15 is a flow chart illustrating aspects of a wireless communication method 1500 according to some aspects of the disclosure. The communication method 1500 may be performed, for example, by any of the access terminals illustrated in the figures, such as the UE 1000 of FIG. 10, or by other suitably-equipped systems, devices or apparatus. At block 1502, the access terminal performs or initiates a hierarchical beam management procedure to determine a plurality of wireless communication beams using at least some beam-specific gain adjustments. At block 1504, the access terminal applies the additional beam-specific gain adjustments during at least one stage of the hierarchical beam management procedure. An exemplary hierarchical beam management procedure is described above with reference to FIG. 8. The additional beam-specific gain adjustments may be, for example, the CSI-RS/SRS beam-specific gain adjustments described above with reference to FIG. 8.

Figure 16:
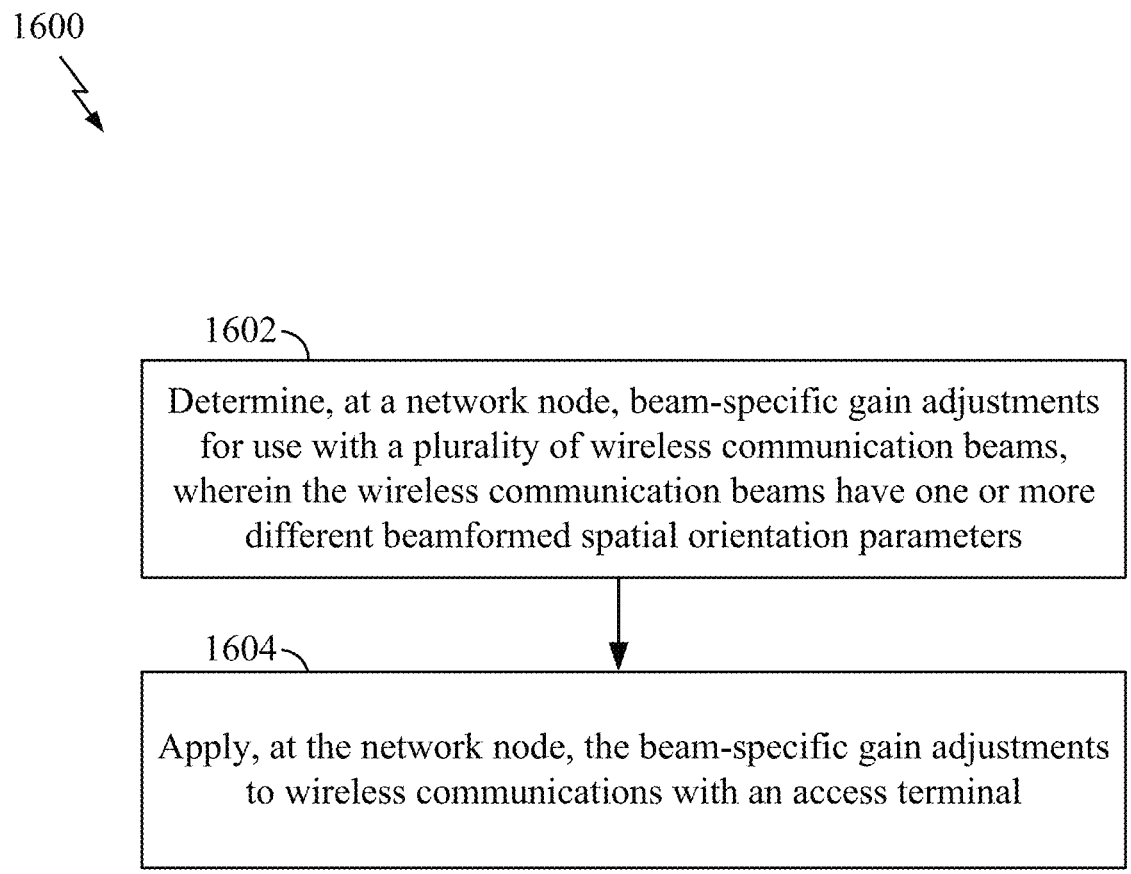
FIG. 16 is a flow chart illustrating an exemplary wireless communication method for use by a network node in accordance with some aspects.

FIG. 16 is a flow chart illustrating a wireless communication method 1600 according to some aspects of the disclosure. The communication method 1600 may be performed, for example, by any of the network nodes illustrated in the figures, such as the network node 1100 of FIG. 11, or by other suitably-equipped systems, devices or apparatus including a wireless communication device. At block 1602, the network node (e.g., the network-side beam-specific gain adjustment determination circuit 1140 of the network node of FIG. 11) determines beam-specific gain adjustments for use with a plurality of wireless communication beams, wherein the wireless communication beams have one or more different beamformed spatial orientation parameters. At block 1604, the network node (e.g., the network-side beam-specific gain adjustment application circuit 1142 of the network node of FIG. 11) applies the beam-specific gain adjustments to wireless communications with an access terminal (e.g., by, for example, controlling the transceiver 1110 of the network node 1100 of FIG. 11). Exemplary details of these operations are discussed above in connection with FIGS. 6-9.

Figure 17:
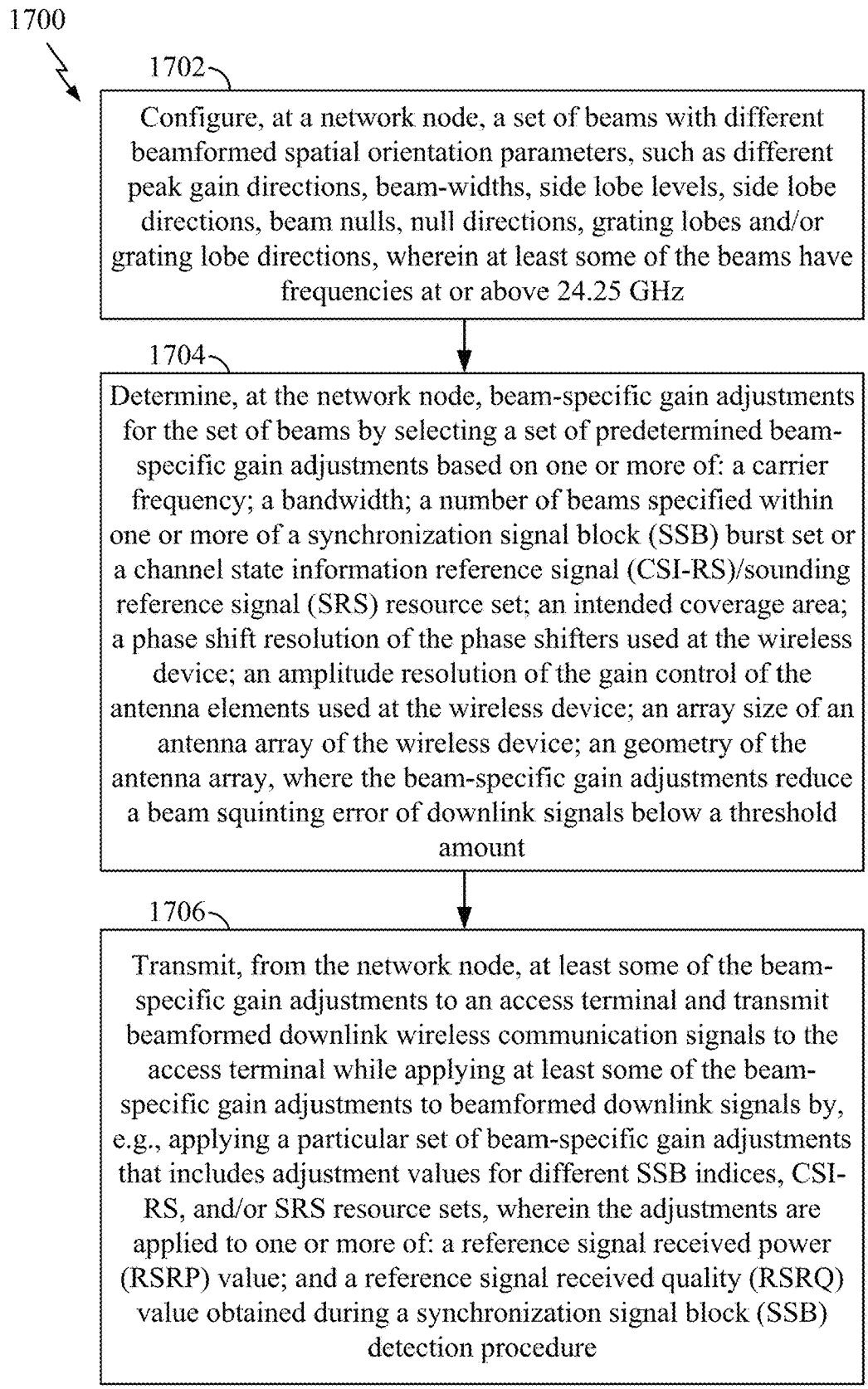
FIG. 17 is a flow chart illustrating further features of an exemplary wireless communication method for use by a network node in accordance with some aspects.

FIG. 17 is a flow chart illustrating aspects of a wireless communication method 1700 according to some aspects of the disclosure. The communication method 1700 may be performed, for example, by any of the network nodes illustrated in the figures, such as the base station 1100 of FIG. 11, or by other suitably-equipped systems, devices or apparatus. At block 1702, the network node configures a set of beams with different beamformed spatial orientation parameters, such as different peak gain directions, beamwidths, side lobe levels, side lobe directions, beam nulls, null directions, grating lobes and/or grating lobe directions, wherein at least some of the beams have frequencies at or above 24.25 GHz. At block 1704, the network node determines beam-specific gain adjustments by selecting a set of predetermined beam-specific gain adjustments based on one or more of: a carrier frequency; a bandwidth; a number of beams specified within one or more of an SSB burst set or a CSI-RS/SRS) resource set; an intended coverage area; a phase shift resolution of the phase shifters used at the wireless device; an amplitude resolution of the gain control of the antenna elements used at the wireless device; an array size of an antenna array of the wireless device; a geometry of the antenna array of the wireless device, where the beam-specific gain adjustments reduce a beam squinting error of downlink wireless communication signals below a threshold amount. At block 1706, the network node transmits at least some of the beam-specific gain adjustments to an access terminal (such as UE 1000 of FIG. 10) and then transmits beamformed downlink wireless communication signals to the access terminal while applying at least some of the beam-specific gain adjustments to the beamformed downlink signals by, e.g., applying a particular set of beam-specific gain adjustments that includes adjustment values for different SSB indices, CSI-RS, and/or SRS resource sets, wherein the adjustments are applied to one or more of: an RSRP value; and a RSRQ value obtained during an SSB detection procedure.

Figure 18:
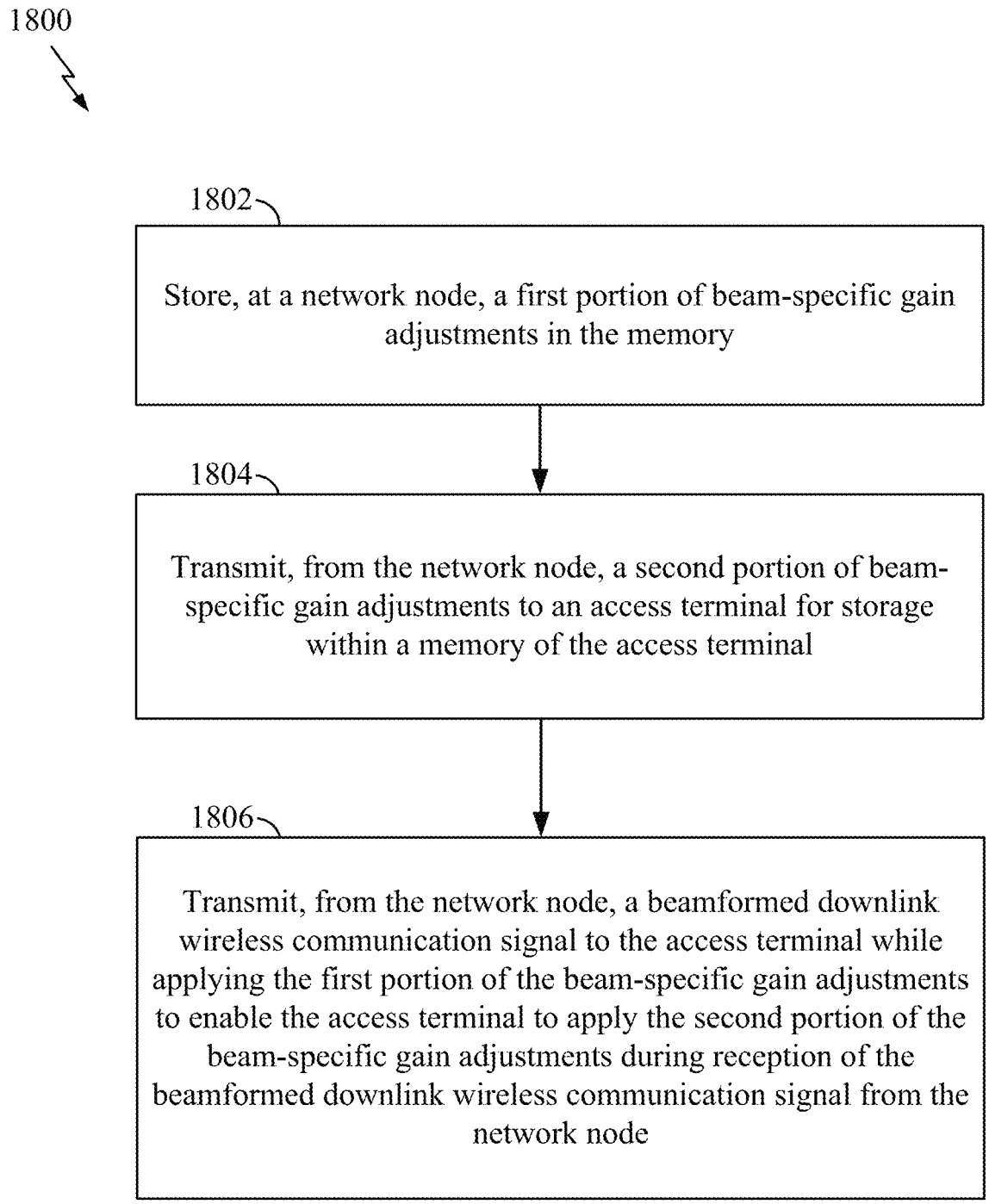
FIG. 18 is a flow chart illustrating still further features of an exemplary wireless communication method for use by a network node in accordance with some aspects.

FIG. 18 is a flow chart illustrating aspects of a wireless communication method 1800 according to some aspects of the disclosure. The communication method 1800 may be performed, for example, by any of the network nodes illustrated in the figures, such as the base station 1100 of FIG. 11, or by other suitably-equipped systems, devices or apparatus. At block 1802, the network node stores a first portion of beam-specific gain adjustments in the memory. At block 1804, the network node transmits a second portion of beam-specific gain adjustments to an access terminal for storage within a memory of the access terminal. At block 1806, the network node transmits a beamformed downlink wireless communication signal to the access terminal while applying the first portion of the beam-specific gain adjustments to enable the access terminal to apply the second portion of the beam-specific gain adjustments during reception of the beamformed downlink wireless communication signal from the network node.

Figure 19:
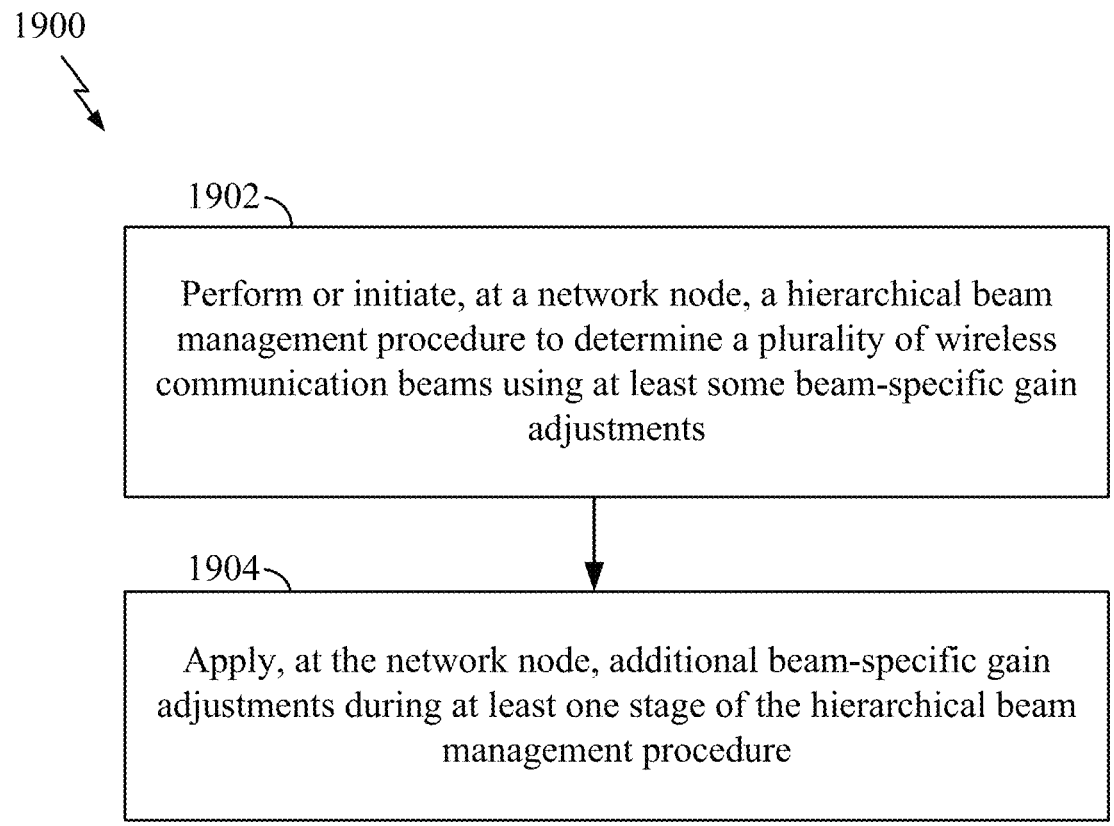
FIG. 19 is a flow chart illustrating still further features of an exemplary wireless communication method for use by a network node in accordance with some aspects.

FIG. 19 is a flow chart illustrating aspects of a wireless communication method 1900 according to some aspects of the disclosure. The communication method 1900 may be performed, for example, by any of the network nodes illustrated in the figures, such as the base station 1100 of FIG. 11, or by other suitably-equipped systems, devices or apparatus. At block 1902, the network node performs or initiates a hierarchical beam management procedure to determine a plurality of wireless communication beams using at least some beam-specific gain adjustments. At block 1904, the network node applies the additional beam-specific gain adjustments during at least one stage of the hierarchical beam management procedure. An exemplary hierarchical beam management procedure is described above with reference to FIG. 8. The additional beam-specific gain adjustments may be, for example, the CSI-RS/SRS beam-specific gain adjustments described above with reference to FIG. 8.

In one configuration, an apparatus for wireless communication includes means for performing the methods and processes as described above, including means for controlling beam-specific gain adjustments as described above. In one aspect, the aforementioned means may be the processor (s) of FIGS. 10 and 11 configured to perform the functions recited by the aforementioned means. In another aspect, the aforementioned means may be a circuit or any apparatus configured to perform the functions recited by the aforementioned means.

Of course, in the above examples, the circuitry included in the processors of FIGS. 10 and 11 is merely provided as an example, and other means for carrying out the described functions may be included within various aspects of the present disclosure, including but not limited to the instructions stored in the computer-readable storage media of FIGS. 10 and 11, or any other suitable apparatus or means described in any one of the figures and utilizing, for example, the processes and/or algorithms described herein in relation to the figures.

The following provides an overview of examples of the present disclosure.

Example 1: a network node comprises: a transceiver; a memory; and a processor communicatively coupled to the transceiver and the memory and configured to: determine beam-specific gain adjustments for use with a plurality of wireless communication beams, wherein the wireless communication beams have one or more different beamformed spatial orientation parameters; and apply the beam-specific gain adjustments to wireless communications with an access terminal.

Example 2: the network node of example 1, wherein the processor is further configured to determine particular beam-specific gain adjustments that reduce a beam squinting error of downlink wireless communication signals to below a threshold amount.

Example 3: the network node of examples 1, or 2, wherein the processor is further configured to select a set of predetermined beam-specific gain adjustments based on one or more of: a carrier frequency; a bandwidth; a number of beams specified within a synchronization signal block (SSB) burst set; a number of beams specified within a channel state information reference signal (CSI-RS)/sounding reference signal (SRS) resource set; an intended coverage area of the network node; a phase shift resolution of phase shifters at the network node; an amplitude resolution of gain control associated with antenna elements at the network node; an array size of an antenna array of the network node; and a geometry of the antenna array of the network node.

Example 4: the network node of examples 1, 2, or 3, wherein the processor is further configured to apply the beam-specific gain adjustments to a transmission of a beamformed downlink wireless communication signal from the network node to the access terminal.

Example 5: the network node of examples 1, 2, 4, or 4, wherein the processor is further configured to: store a first portion of the beam-specific gain adjustments in the memory; transmit a second portion of the beam-specific gain adjustments to the access terminal for storage within a memory of the access terminal; and transmit a beamformed downlink wireless communication signal to the access terminal while applying the first portion of the beam-specific gain adjustments to enable the access terminal to apply the second portion of the beam-specific gain adjustments during reception of the beamformed downlink wireless communication signal from the network node.

Example 6: the network node of examples 1, 2, 3, 4, or 5, wherein the processor is further configured to perform a hierarchical beam management procedure to determine the plurality of wireless communication beams and to apply the beam-specific gain adjustments during at least one stage of the hierarchical beam management procedure.

Example 7: the network node of examples 1, 2, 3, 4, 5, or 6, wherein the processor is further configured to determine transmit gain power adjustments.

Example 8: the network node of examples 1, 2, 3, 4, 6, or 7, wherein the processor is further configured to determine at least one of a peak gain direction, a beam-width, a side lobe level, a side lobe direction, a beam null, a null direction, a grating lobe, and a grating lobe direction for use as a beamformed spatial orientation parameter.

Example 9: a method for wireless communication for use by a network node, the method comprising: determining beam-specific gain adjustments for use with a plurality of wireless communication beams, wherein the wireless communication beams have one or more different beamformed spatial orientation parameters; and applying the beam-specific gain adjustments to wireless communications with an access terminal.

Example 10: the method of example 9, wherein determining the beam-specific gain adjustments comprises determining particular beam-specific gain adjustments that reduce a beam squinting error of downlink wireless communication signals below a threshold amount.

Example 11: the method of examples 9, or 10, wherein determining the beam-specific gain adjustments comprises selecting a set of predetermined beam-specific gain adjustments based on one or more of: a carrier frequency; a bandwidth; a number of beams specified within a synchronization signal block (SSB) burst set; a number of beams specified within a channel state information reference signal (CSI-RS)/sounding reference signal (SRS) resource set; an intended coverage area of the network node; a phase shift resolution of phase shifters at the network node; an amplitude resolution of gain control associated with antenna elements at the network node; an array size of an antenna array of the network node; and a geometry of the antenna array of the network node.

Example 12: the method of examples 9, 10, or 11, wherein the beam-specific gain adjustments are applied to transmission of a beamformed downlink wireless communication signal from the network node to the access terminal.

Example 13: the method of examples 9, 10, 11, or 12, further comprising storing a first portion of the beam-specific gain adjustments in a memory of the network node, and wherein applying the beam-specific gain adjustments to the wireless communications with the access terminal comprises: transmitting a second portion of the beam-specific gain adjustments to the access terminal for storage within a memory of the access terminal; and transmitting a beamformed downlink wireless communication signal to the access terminal while applying the first portion of the beam-specific gain adjustments to enable the access terminal to apply the second portion of the beam-specific gain adjustments during reception of the beamformed downlink wireless communication signal from the network node.

Example 14: the method of examples 9, 10, 11, 12, or 13, further comprising performing a hierarchical beam management procedure to determine the plurality of wireless communication beams of the network node and wherein the beam-specific gain adjustments are applied during at least one stage of the hierarchical beam management procedure.

Example 15: the method of examples 9, 10, 11, 12, or 13, wherein the beam-specific gain adjustments comprise transmit gain power adjustments.

Example 15: the method of examples 9, 10, 11, 12, or 13, wherein the beamformed spatial orientation parameters comprise at least one of a peak gain direction, a beam-width, a side lobe level, a side lobe direction, a beam null, a null direction, a grating lobe and a grating lobe direction.

Example 17: an access terminal comprising: a transceiver; a memory; and a processor communicatively coupled to the transceiver and the memory and configured to: receive beam-specific gain adjustments from a network node for use with a plurality of wireless communication beams, wherein the wireless communication beams have one or more different beamformed spatial orientation parameters; and apply the beam-specific gain adjustments to wireless communications with the network node.

Example 18: the access terminal of example 17, wherein the processor is further configured to: receive beamformed downlink wireless communication signals from the network node; and apply the beam-specific gain adjustments to the beamformed downlink wireless communication signals.

Example 19: the access terminal of examples 17 or 18, wherein the processor is further configured to transmit beamformed uplink signals to the network node while applying the beam-specific gain adjustments to the beamformed uplink signals.

Example 20: the access terminal of examples 17, 18, or 19, wherein the processor is further configured to: determine additional beam-specific gain adjustments for use with the plurality of wireless communication beams; and apply the additional beam-specific gain adjustments to beamformed uplink wireless communication signals for transmission to the network node.

Example 21: the access terminal of examples 17, 18, 19, or 20, wherein the processor is further configured to perform a hierarchical beam management procedure to determine the plurality of wireless communication beams and to apply the additional beam-specific gain adjustments during at least one stage of the hierarchical beam management procedure.

Example 22: the access terminal of examples 17, 18, 19, 20, or 21, wherein the processor is further configured to apply the beam-specific gain adjustments to one or more of: a reference signal received power (RSRP) value; and a reference signal received quality (RSRQ) value obtained during a synchronization signal block (SSB) detection procedure.

Example 23: the access terminal of examples 17, 18, 19, 20, 21, or 22, wherein each of the plurality of wireless communication beams corresponds to one or more of a different channel state information reference signal (CSI-RS) and a different sounding reference signal (SRS) indicator.

Example 24: the access terminal of examples 17, 18, 19, 20, 21, 22, or 23, wherein the processor is further configured to determine at least one of a peak gain direction, a beam width, a side lobe level, a side lobe direction, a beam null, a null direction, a grating lobe and a grating lobe direction for use as a beamformed spatial orientation parameter.

Example 25: a method for wireless communication for use by an access terminal, the method comprising: receiving beam-specific gain adjustments from a network node for use with a plurality of wireless communication beams, wherein the wireless communication beams have one or more different beamformed spatial orientation parameters; and applying the beam-specific gain adjustments to wireless communications with the network node.

Example 26: the method of example 25, wherein applying the beam-specific gain adjustments to the wireless communications with the network node comprises: receiving beamformed downlink wireless communication signals from the network node; and applying the beam-specific gain adjustments to the beamformed downlink wireless communication signals.

Example 27: the method of examples 25 or 26, wherein the beam-specific gain adjustments are applied to beamformed uplink wireless communication signals transmitted to the network node.

Example 28: the method examples 25, 26, or 27, further comprising: determining additional beam-specific gain adjustments for use with the plurality of wireless communication beams; and applying the additional beam-specific gain adjustments to beamformed uplink wireless communication signals for transmission to the network node.

Example 29: the method examples 25, 26, 27, or 28, further comprising performing a hierarchical beam management procedure to determine the plurality of wireless communication beams and applying the additional beam-specific gain adjustments during at least one stage of the hierarchical beam management procedure.

Example 30: the method examples 25, 26, 27, 28, or 29, wherein the beam-specific gain adjustments are applied to one or more of: a reference signal received power (RSRP) value; and a reference signal received quality (RSRQ) value obtained during a synchronization signal block (SSB) detection procedure.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While aspects and embodiments are described in this application by illustration to some examples, those skilled in the art will understand that additional implementations and use cases may come about in many different arrangements and scenarios. Features described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range across the spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that features described herein may be practiced in a wide variety of devices, chip-level components, systems, distributed arrangements, end-user devices, etc. of varying sizes, shapes and constitution.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIG. 1, 2, 4, 6, 7, 8, 9, 10, 11, 12, 13, 14, 15, 16, 17, 18, or 19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in 1, 2, 4, 10, and 11 may be configured to perform one or more of the methods, features, or steps described herein. The novel algorithms described herein may also be efficiently implemented in software and/or embedded in hardware. Generally speaking, the various components, steps, features and/or functions illustrated in FIGS. 1-19 are not mutually exclusive.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network node, comprising:
    a transceiver;
    a memory; and
    a processor communicatively coupled to the transceiver and the memory and configured to:
        transmit first beamformed downlink wireless communication signals to an access terminal using a plurality of wireless communication beams configured as synchronization signal block (SSB) signals while applying beam-specific gain adjustments to the plurality of wireless communication beams, wherein the wireless communication beams have one or more different beamformed spatial orientation parameters and wherein the beam-specific gain adjustments are applied to at least one of the spatial orientation parameters;
        receive a report from the access terminal providing received power information for the plurality of wireless communication beams; and
        transmit a second beamformed downlink wireless communication signal to the access terminal as a channel state information reference signal (CSI-RS)/sounding reference signal (SRS) signal using a selected one of the plurality of wireless communication beams while applying a corresponding beam-specific gain adjustment, the beam selected based on information in the report.

2. The network node of claim 1, wherein the processor is further configured to determine the beam-specific gain adjustments to reduce a beam squinting error of downlink wireless communication signals to below a threshold amount.

3. The network node of claim 1, wherein the processor is further configured to select a set of predetermined beam-specific gain adjustments based on one or more of: a carrier frequency; a bandwidth; a number of beams specified within an SSB burst set; a number of beams specified within a CSI-RS/SRS resource set; an intended coverage area of the network node; a phase shift resolution of phase shifters at the network node; an amplitude resolution of gain control associated with antenna elements at the network node; an array size of an antenna array of the network node; and a geometry of the antenna array of the network node.

4. The network node of claim 1, wherein the processor is further configured to:
    store a first portion of the beam-specific gain adjustments in the memory;
    transmit a second portion of the beam-specific gain adjustments to the access terminal for storage within a memory of the access terminal; and
    transmit the second beamformed downlink wireless communication signal to the access terminal while applying the first portion of the beam-specific gain adjustments to enable the access terminal to apply the second portion of the beam-specific gain adjustments during reception of the second beamformed downlink wireless communication signal from the network node.

5. The network node of claim 1, wherein the processor is further configured to perform a hierarchical beam management procedure to determine the plurality of wireless communication beams and to apply the beam-specific gain adjustments during at least one stage of the hierarchical beam management procedure.

6. The network node of claim 1, wherein the processor is further configured to determine transmit gain power adjustments for use as the beam-specific gain adjustments.

7. The network node of claim 1, wherein the processor is further configured to determine at least one of a peak gain direction, a beam-width, a side lobe level, a side lobe direction, a beam null, a null direction, a grating lobe, and a grating lobe direction for use as a beamformed spatial orientation parameter.

8. A method for wireless communication for use by a network node, the method comprising:

transmitting first beamformed downlink wireless communication signals to an access terminal using a plurality of wireless communication beams configured as synchronization signal block (SSB) signals while applying beam-specific gain adjustments to the plurality of wireless communication beams, wherein the wireless communication beams have one or more different beamformed spatial orientation parameters and wherein the beam-specific gain adjustments are applied to at least one of the spatial orientation parameters;

receiving a report from the access terminal providing received power information for the plurality of wireless communication beams; and transmitting a second beamformed downlink wireless communication signal to the access terminal as a channel state information reference signal (CSI-RS)/sounding reference signal (SRS) signal using a selected one of the plurality of wireless communication beams while applying a corresponding beam-specific gain adjustment, the beam selected based on information in the report.

9. The method of claim 8, wherein determining the beam-specific gain adjustments comprises determining the beam-specific gain adjustments to reduce a beam squinting error of downlink wireless communication signals below a threshold amount.

10. The method of claim 8, wherein determining the beam-specific gain adjustments comprises selecting a set of predetermined beam-specific gain adjustments based on one or more of: a carrier frequency; a bandwidth; a number of beams specified within a an SSB burst set; a number of beams specified within a CSI-RS/SRS resource set; an intended coverage area of the network node; a phase shift resolution of phase shifters at the network node; an amplitude resolution of gain control associated with antenna elements at the network node; an array size of an antenna array of the network node; and a geometry of the antenna array of the network node.

11. The method of claim 8, further comprising storing a first portion of the beam-specific gain adjustments in a memory of the network node, and wherein applying the beam-specific gain adjustments to the wireless communications with the access terminal comprises:

transmitting a second portion of the beam-specific gain adjustments to the access terminal for storage within a memory of the access terminal; and transmitting the second beamformed downlink wireless communication signal to the access terminal while applying the first portion of the beam-specific gain adjustments to enable the access terminal to apply the second portion of the beam-specific gain adjustments during reception of the second beamformed downlink wireless communication signal from the network node.

12. The method of claim 8, further comprising performing a hierarchical beam management procedure to determine the plurality of wireless communication beams of the network node and wherein the beam-specific gain adjustments are applied during at least one stage of the hierarchical beam management procedure.

13. The method of claim 8, wherein the beam-specific gain adjustments comprise transmit gain power adjustments for use as the beam-specific gain adjustments.

14. The method of claim 8, wherein the beamformed spatial orientation parameters comprise at least one of a peak gain direction, a beam-width, a side lobe level, a side lobe direction, a beam null, a null direction, a grating lobe and a grating lobe direction.

15. An access terminal, comprising:
a transceiver;
a memory; and
a processor communicatively coupled to the transceiver and the memory and configured to:
receive beam-specific gain adjustments from a network node for use with a plurality of wireless communication beams configured as synchronization signal block (SSB) signals, wherein the wireless communication beams have one or more different beamformed spatial orientation parameters and wherein the beam-specific gain adjustments apply to at least one of the spatial orientation parameters;
receive beamformed downlink wireless communication signals from the network node transmitted using the plurality of wireless communication beams;
transmit a report to the network node providing received power values for the plurality of wireless communication beams, wherein the received power values in the report are adjusted in accordance with the beam-specific gain adjustments; and
receive a second beamformed downlink wireless communication signal from the access terminal as a channel state information reference signal (CSI-RS)/sounding reference signal (SRS) signal.

16. The access terminal of claim 15, wherein the processor is further configured to:
receive additional beamformed downlink wireless communication signals from the network node; and
apply the beam-specific gain adjustments to the additional beamformed downlink wireless communication signals.

17. The access terminal of claim 15, wherein the processor is further configured to transmit beamformed uplink signals to the network node while applying the beam-specific gain adjustments to the beamformed uplink signals.

18. The access terminal of claim 17, wherein the processor is further configured to:
determine additional beam-specific gain adjustments for use with the plurality of wireless communication beams; and
apply the additional beam-specific gain adjustments to beamformed uplink wireless communication signals for transmission to the network node.

19. The access terminal of claim 18, wherein the processor is further configured to perform a hierarchical beam management procedure to determine the plurality of wireless communication beams and to apply the additional beam-specific gain adjustments during at least one stage of the hierarchical beam management procedure.

20. The access terminal of claim 15, wherein the processor is further configured to apply the beam-specific gain adjustments to one or more of: a reference signal received power (RSRP) value; and a reference signal received quality (RSRQ) value obtained during an SSB detection procedure.

21. The access terminal of claim 15, wherein each of the plurality of wireless communication beams corresponds to one or more of a different CSI-RS indicator and a different SRS indicator.

22. The access terminal of claim 15, wherein the processor is further configured to determine at least one of a peak gain direction, a beam width, a side lobe level, a side lobe direction, a beam null, a null direction, a grating lobe and a grating lobe direction for use as a beamformed spatial orientation parameter.

23. A method for wireless communication for use by an access terminal, the method comprising:

receiving beam-specific gain adjustments from a network node for use with a plurality of wireless communication beams configured as synchronization signal block (SSB) signals, wherein the wireless communication beams have one or more different beamformed spatial orientation parameters and wherein the beam-specific gain adjustments apply to at least one of the spatial orientation parameters;

receiving beamformed downlink wireless communication signals from the network node transmitted using the plurality of wireless communication beams;

transmitting a report to the network node providing received power values for the plurality of wireless communication beams, wherein the received power values in the report are adjusted in accordance with the beam-specific gain adjustments; and receiving a second beamformed downlink wireless communication signal from the access terminal as a channel state information reference signal (CSI-RS)/sounding reference signal (SRS) signal.

24. The method of claim 23, wherein applying the beam-specific gain adjustments to the wireless communications with the network node comprises:
receiving additional beamformed downlink wireless communication signals from the network node; and
applying the beam-specific gain adjustments to the additional beamformed downlink wireless communication signals.

25. The method of claim 23, further comprising transmitting beamformed uplink signals to the network node while applying the beam-specific gain adjustments to the beamformed uplink signals.

26. The method of claim 25, further comprising:
determining additional beam-specific gain adjustments for use with the plurality of wireless communication beams; and
applying the additional beam-specific gain adjustments to beamformed uplink wireless communication signals for transmission to the network node.

27. The method of claim 26, further comprising performing a hierarchical beam management procedure to determine the plurality of wireless communication beams and applying the additional beam-specific gain adjustments during at least one stage of the hierarchical beam management procedure.

28. The method of claim 23, wherein the beam-specific gain adjustments are applied to one or more of: a reference signal received power (RSRP) value; and a reference signal received quality (RSRQ) value obtained during a an SSB detection procedure.

29. A network node, comprising:
a transceiver;
a memory; and
a processor communicatively coupled to the transceiver and the memory and configured to:
transmit first beamformed downlink wireless communication signals to an access terminal using a plurality of wireless communication beams while applying beam-specific gain adjustments to the plurality of wireless communication beams, wherein the wireless communication beams have one or more different beamformed spatial orientation parameters and wherein the beam-specific gain adjustments are applied to at least one of the spatial orientation parameters;
receive a report from the access terminal providing received power information for the plurality of wireless communication beams;
transmit a second portion of first and second portions of the beam-specific gain adjustments to the access terminal for storage within a memory of the access terminal; and
transmit a second beamformed downlink wireless communication signal to the access terminal using a selected one of the plurality of wireless communication beams, with the beam selected based on information in the report, and with the second beamformed downlink wireless communication signal transmitted while applying the first portion of the beam-specific gain adjustments to enable the access terminal to apply the second portion of the beam-specific gain adjustments during reception of the second beamformed downlink wireless communication signal from the network node.

30. A method for wireless communication for use by a network node, the method comprising:
transmitting first beamformed downlink wireless communication signals to an access terminal using a plurality of wireless communication beams while applying beam-specific gain adjustments to the plurality of wireless communication beams, wherein the wireless communication beams have one or more different beamformed spatial orientation parameters and wherein the beam-specific gain adjustments are applied to at least one of the spatial orientation parameters;
receiving a report from the access terminal providing received power information for the plurality of wireless communication beams;
transmitting a second portion of first and second portions of the beam-specific gain adjustments to the access terminal for storage within a memory of the access terminal; and
transmitting a second beamformed downlink wireless communication signal to the access terminal using a selected one of the plurality of wireless communication beams, the beam selected based on information in the report, and with the second beamformed downlink wireless communication signal transmitted while applying the first portion of the beam-specific gain adjustments to enable the access terminal to apply the second portion of the beam-specific gain adjustments during reception of the second beamformed downlink wireless communication signal from the network node.

* * * * *